US010324562B2

(12) United States Patent
Cho et al.

(10) Patent No.: US 10,324,562 B2
(45) Date of Patent: Jun. 18, 2019

(54) METHOD FOR PROCESSING USER INPUT AND ELECTRONIC DEVICE THEREOF

(71) Applicant: Samsung Electronics Co., Ltd., Gyeonggi-do (KR)

(72) Inventors: Youngho Cho, Seoul (KR); Jeong-Jin Lee, Seoul (KR); Iljoo Chae, Gyeonggi-do (KR); Chang-Hee Hong, Gyeonggi-do (KR); Moo-Young Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/606,105

(22) Filed: May 26, 2017

(65) Prior Publication Data

US 2017/0357365 A1 Dec. 14, 2017

(30) Foreign Application Priority Data

Jun. 14, 2016 (KR) .................. 10-2016-0073898

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 2203/04104* (2013.01); *G06F 2203/04105* (2013.01); *G06F 2203/04106* (2013.01)

(58) Field of Classification Search
CPC . G06F 2203/04104; G06F 2203/04105; G06F 2203/04106; G06F 3/0414; G06F 3/0416; G06F 3/044
See application file for complete search history.

(56) References Cited

U.S. PATENT DOCUMENTS

| 9,904,417 | B2* | 2/2018 | Hanauer ................. G06F 3/044 |
| 2013/0194237 | A1 | 8/2013 | Kyung et al. |
| 2013/0342501 | A1 | 12/2013 | Molne et al. |
| 2014/0071084 | A1 | 3/2014 | Sugiura |
| 2014/0333577 | A1 | 11/2014 | Ahn |

(Continued)

FOREIGN PATENT DOCUMENTS

| KR | 10-1577277 B1 | 12/2015 |
| KR | 10-2016-0005656 A | 1/2016 |
| WO | 2016/022985 A1 | 2/2016 |

OTHER PUBLICATIONS

International Search Report dated Sep. 27, 2017.
European Search Report dated Oct. 13, 2017.

*Primary Examiner* — Dmitriy Bolotin
(74) *Attorney, Agent, or Firm* — Cha & Reiter, LLC.

(57) ABSTRACT

An apparatus and method for processing a user input in an electronic device are provided. The electronic device includes a touch device detecting a touch input; a pressure device detecting a pressure input; and at least one processor. The at least one processor is configured to if the pressure input is detected, generate an event corresponding to the pressure input, determine if the touch input is detected while the pressure input is detected, if the touch input is detected while the pressure input is detected, update the event to correspond to the pressure input and the touch input, and process the updated event.

13 Claims, 31 Drawing Sheets

(56) References Cited

U.S. PATENT DOCUMENTS

2015/0301642 A1* 10/2015 Hanauer ............... G06F 3/0414
                                                    345/174
2015/0370387 A1   12/2015 Yamaguchi et al.
2016/0054851 A1    2/2016 Kim et al.
2016/0085355 A1    3/2016 Pirogov et al.
2016/0224171 A1    8/2016 Kim et al.
2017/0344155 A1*  11/2017 Lee ..................... G06F 3/044
2017/0351850 A1*  12/2017 Jin ..................... G06F 21/32

* cited by examiner

METHOD FOR PROCESSING USER INPUT AND ELECTRONIC DEVICE THEREOF

CLAIM OF PRIORITY

This application claims priority under 35 U.S.C. § 119(a) to a Korean Patent Application filed in the Korean Intellectual Property Office on Jun. 14, 2016 and assigned Serial No. 10-2016-0073898, the contents of which are herein incorporated by reference.

BACKGROUND

1. Field of the Invention

Various exemplary embodiments of the present disclosure relate to an apparatus and a method for processing a user's input in an electronic device.

2. Description of the Related Art

With an increase in using electronic devices for multimedia services, the quantity of information that is processed and displayed in the electronic device is increasing. Accordingly, an electronic device with a touch screen that is capable of processing and displaying multimedia information increasingly being used.

The touch screen generally can simultaneously perform input and output operations. As an example, the touch screen can receive touch inputs while simultaneously output display images. In other words, the electronic device can sense a user's touch input on the touch screen, and perform a control command responsive to the touch input in order to display the control command execution result on the touch screen.

SUMMARY

Increasing, the touch screens of electronic devices are also equipped with pressure sensors in addition to touch sensors. Accordingly, the electronic device can receive pressure information detected through a pressure device in addition to the touch input detected through the touch screen, so that varied functionality can be provided to the user.

However, a problem can occur in which the event provided using the touch input and the pressure is limited in that the electronic device considers only the pressure additionally to a touch coordinate detected through the touch input.

Also, because touch inputs and pressure inputs are detected independently by the touch sensor and the pressure sensor, novel methods for correlating the touch inputs and the pressure inputs are needed.

Various exemplary embodiments of the present disclosure provide an apparatus and method for generating an event using a touch input and a pressure input in an electronic device.

Various exemplary embodiments of the present disclosure provide an apparatus and method for matching a touch input and a pressure input in an electronic device.

According to one exemplary embodiment of the present disclosure, an electronic device includes a touch device detecting a touch input; a pressure device detecting a pressure input; and at least one processor. The at least one processor is configured to if the pressure input is detected, generate an event corresponding to the pressure input, determine if the touch input is detected while the pressure input is detected, if the touch input is detected while the pressure input is detected, update the event to correspond to the pressure input and the touch input, and process the updated event.

According to one exemplary embodiment of the present disclosure, a method for operating in an electronic device includes the operations of, if a pressure input is detected by the pressure device, generating an event corresponding to the pressure input; determining if a touch input is detected by the touch device while the pressure input is detected; if the touch input is detected while the pressure input is detected, updating the event to correspond to the pressure input and the touch input; and processing the updated event.

According to one exemplary embodiment of the present disclosure, an electronic device includes a first input device detecting a first input; a second input device detecting a second input; and at least one processor. The at least one processor is configured to receive the detected first input from the first input device, receive the detected second input from the second input device, match the first input and the second input, and process an event corresponding to the matched first input and the second input for an application executing in the electronic device.

DETAILED DESCRIPTION

Figure 1A:
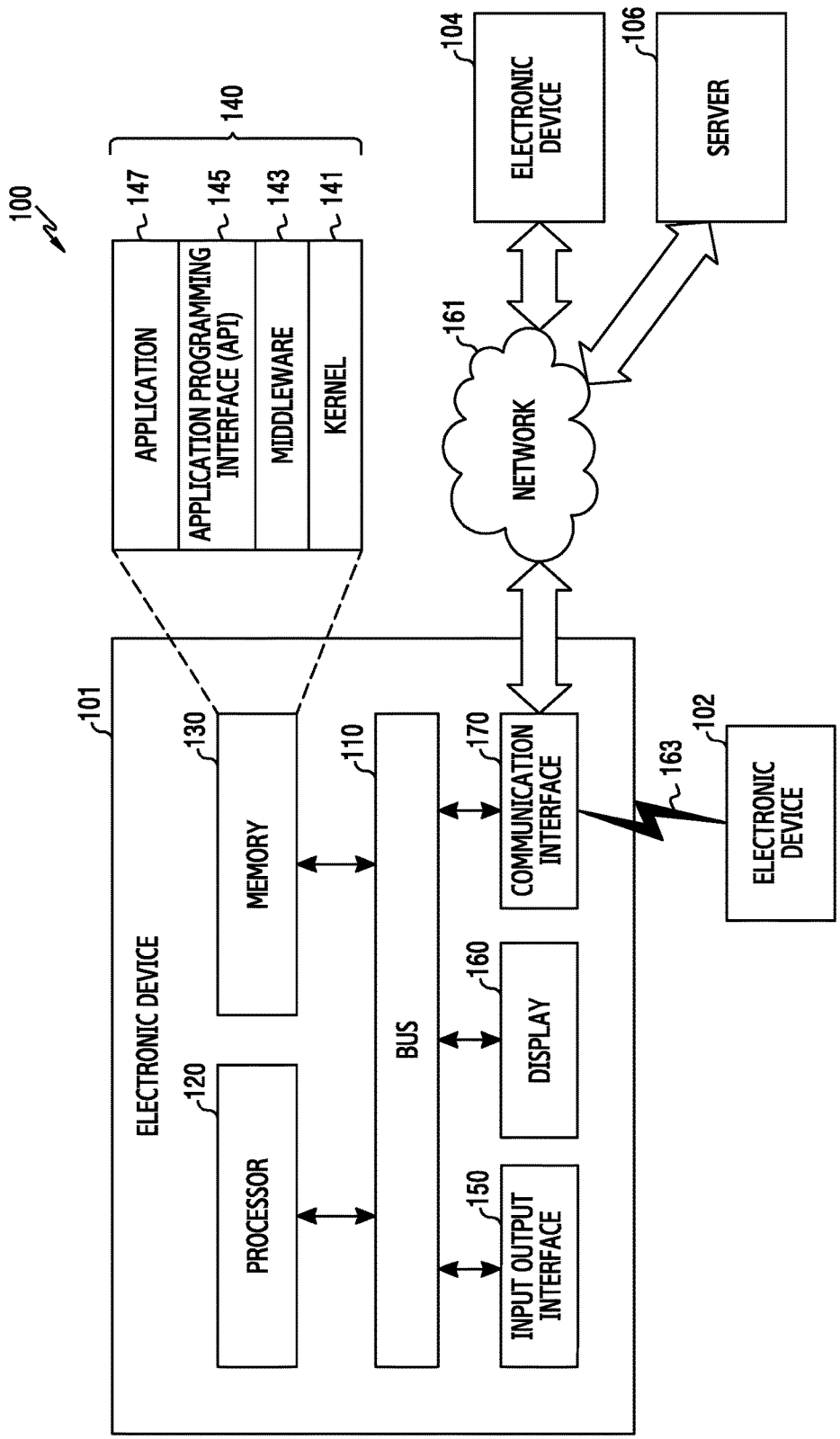
FIG. 1A illustrates an electronic device within a network environment accordingly to one exemplary embodiment of the present disclosure.

Hereinafter, various exemplary embodiments of the present document are described with reference to the accompanying drawings. It should be understood, however, that it is not intended to limit the various exemplary embodiments of the present document to the particular form disclosed, but, on the contrary, it is intended to cover all modifications, equivalents, and alternatives falling within the spirit and scope of the various exemplary embodiments of the present document. Like reference numerals denote like components throughout the drawings. A singular expression includes a plural concept unless there is a contextually distinctive difference therebetween.

In the present document, an expression "A or B," "A and/or B," or the like may include all possible combinations of items enumerated together. Although expressions such as "1st," "2nd," "first," and "second" may be used to express corresponding constitutional elements, it is not intended to limit the corresponding constitutional elements. When a certain (e.g., 1st) constitutional element is mentioned as being "operatively or communicatively coupled with/to" or "connected to" a different (e.g., 2nd) constitutional element, the certain constitutional element is directly coupled with/to another constitutional element or can be coupled with/to the different constitutional element via another (e.g., 3rd) constitutional element.

An expression "configured to" used in the present document may be interchangeably used with, for example, "suitable for," "having the capacity to," "adapted to," "made to," "capable of," or "designed to" in a hardware or software manner according to a situation. In certain situations, an expressed "a device configured to" may imply that the device is "capable of" together with other devices or components. For example, "a processor configured to perform A, B, and C" may imply a dedicated processor (e.g., an embedded processor) for performing the corresponding operation or a generic-purpose processor (e.g., Central Processing Unit (CPU) or an application processor) capable of performing the corresponding operations by executing one or more software programs stored in a memory device.

An electronic device according to various embodiments of the present disclosure, for example, may include at least one of a smart-phone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device may be a home appliance, which may be at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1A illustrates an electronic device 101 within a network environment 100 according to one exemplary embodiment of the present disclosure.

Referring to FIG. 1A, the electronic device 101 can include a bus 110, a processor 120 (e.g., including processing circuitry), a memory 130, an input output interface 150 (e.g., including input/output circuitry), a display 160 (e.g., including display circuitry), and a communication interface 170 (e.g., including communication circuitry). In some exemplary embodiments, the electronic device 101 can omit at least one of the constituent elements or additionally have other constituent elements.

The bus 110 can, for example, include a circuit coupling the constituent elements 120 to 170 with one another and forwarding communications (e.g., a control message and/or data) between the constituent elements.

The processor 120 can include one or more of a Central Processing Unit (CPU), an Application Processor (AP), a Communication Processor (CP) or an Image Signal Processor (ISP). The processor 120 can, for example, execute operation or data processing for control and/or communication of at least one another constituent element of the electronic device 101. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

According to one exemplary embodiment, the processor 120 can control to generate an event corresponding to at least one input information that is acquired by an input device. Accordingly, upon receiving the input, the processor 120 can control to process an operation or function corresponding to the event in an application executing in the electronic device 101. For instance, the input device may be a touch panel, a pressure panel, etc., for detecting an input such as a touch input or a pressure input. In another embodiment, if the electronic device 101 includes a plurality of input devices, the processor 120 may receive a plurality of inputs and generate the event accordingly. For example, if the electronic device 101 includes a touch panel and the pressure panel, then the processor 120 may generate events based on both touch inputs and pressure inputs. For example, the touch panel and pressure panel may include different resolution.

According to one exemplary embodiment, when a touch input is detected by a touch panel, the processor 120 can generate an event corresponding to the touch input. During the time when the touch input is detected, if pressure input is also detected by a pressure panel, the processor 120 can update the event attribute based on the touch input and the pressure input. For example, in case where the touch input is detected, the processor 120 can generate an event corresponding to a touch coordinate. During this time, if a pressure input is also detected, the processor 120 can update the event to correspond to the touch coordinate and a pressure strength of the pressure input.

According to one exemplary embodiment, when generating the event corresponding to the touch input and the pressure input, upon detecting that the touch input is released, the processor 120 can terminate the generation of the event corresponding to input information. For example, when the touch input releases, e.g. when the user lifts his or her finger from the touch screen of the electronic device 101, the processor 120 can terminate the generation of the event corresponding to input information. Additionally or alternatively, when the touch input releases, the processor 120 can control a pressure device such that an interrupt by a pressure input is not generated. For instance, the pressure device can include a pressure panel for detecting a pressure input, and/or a pressure Integrated Circuit (IC) for transmitting the pressure input to the processor 120 (or an upper layer (e.g., middleware, API or application). For example, when the touch input releases, the processor 120 can control the pressure device so that the pressure IC does not transmit an interrupt.

According to one exemplary embodiment, when the pressure input is detected by a pressure panel, the processor 120 can generate an event corresponding to the pressure input. For example, the processor 120 can generate an event corresponding to the pressure input from a time when the pressure input is detected. As another example, the processor 120 can generate the event corresponding to the pressure input after the lapse of a reference time the time when the pressure input is detected. For instance, the pressure input can include at least one of a pressure coordinate and a pressure strength.

According to one exemplary embodiment, during the time when the pressure input is detected, if the touch input is also detected by the touch panel, the processor 120 can update an attribute of the event based on the touch input and the pressure input. For example, when the touch input is detected while the pressure input is detected, the processor 120 can generate an event corresponding to a touch coordinate and a pressure strength. For instance, the event attribute can be based on input variables such as coordinate information and/or pressure information of the touch and pressure inputs.

According to one exemplary embodiment, if a 2nd input is detected by a 2nd input device (e.g., a pressure device) while detecting a 1st input by a 1st input device (e.g., a touch device), the processor 120 can match the 1st input and the 2nd input. For example, if a multi pressure input (e.g. pressure input detected simultaneously at multiple points on the touch screen) is detected while a multi touch input (e.g. touch input detected simultaneously at multiple points on the touch screen) is detected, the processor 120 can compare a coordinate of a touch input and a coordinate of a pressure input, and match one touch input and one pressure input. For instance, the processor 120 can determine to match a touch input and a pressure input that are the closest in distance. Additionally or alternatively, in case where the processor 120 detects the pressure input while the touch input is detected, the processor 120 can compare distances between coordinates of a touch input with which another pressure input is not matched and a newly detected pressure input, and decide the touch input matching with the newly detected pressure input.

According to one exemplary embodiment, the processor 120 can adjust the number of pressure channels to correspond to an application or content that is executed in the electronic device 101. The pressure channel is a channel that is used to provide the application with a pressure input detected be a pressure device. For example, when the application that is being executed in the electronic device 101 supports four multi pressure inputs, the processor 120 can limit the number of pressure channels to four.

According to one exemplary embodiment, if the electronic device 101 or the application does not support multi pressure inputs, the processor 120 can select a pressure input (i.e., a criterion pressure) that will be provided to the application. For example, if the application does not support multi pressure inputs but the pressure panel detects two pressure inputs, the processor 120 can select one pressure input having the strongest pressure among the two pressure inputs, and provide the selected pressure input to the application. If the strengths of the two pressure inputs change, the processor 120 can change the pressure input provided to the application. For example, the processor 120 can select the pressure input that will be provided to the application, based on the center of gravity of an object (e.g., finger) touching on the display 160.

The memory 130 can include a volatile and/or non-volatile memory. The memory 130 can, for example, store a command or data related to at least one another constituent element of the electronic device 101. According to one exemplary embodiment, the memory 130 can store a software and/or program 140. For example, the program 140 can include a kernel 141, a middleware 143, an Application Programming Interface (API) 145, an application program (or "application") 147, etc. At least some of the kernel 141, the middleware 143, or the API 145 can be called an Operating System (OS).

The kernel 141 can, for example, control or manage system resources (e.g., the bus 110, the processor 120, the memory 130, etc.) that are used for executing operations or functions implemented in other programs (e.g., the middleware 143, the API 145, or the application program 147). Also, the kernel 141 can provide an interface that is capable of controlling or managing the system resources by enabling the middleware 143, the API 145, or the application program 147 to gain access to the individual constituent element of the electronic device 101.

The middleware 143 can, for example, perform a relay role of enabling the API 145 or the application program 147 to communicate and exchange data with the kernel 141. Also, the middleware 143 can process one or more work requests received from the application program 147 in accordance with the order of priority. For example, the middleware 143 can grant at least one of the application programs 147 the order of priority capable of using the system resources (e.g., the bus 110, the processor 120, the memory 130, etc.) of the electronic device 101, and process the one or more work requests. The API 145 is, for example, an interface of enabling the application program 147 to control a function of the kernel 141 or the middleware 143, and can, for example, include at least one interface or function (e.g., instruction) for file control, window control, picture processing, character control, etc.

The input output interface 150 can, for example, be an interface that is capable of forwarding a command or data that is inputted from a user or another external device, to another constituent element(s) of the electronic device 101.

The display 160 can, for example, include a Liquid Crystal Display (LCD), a Light Emitting Diode (LED) display, an Organic Light Emitting Diode (OLED) display, or a MicroElectroMechanical Systems (MEMS) display, or an electronic paper display. For example, the display 160 can display various contents (e.g., a text, an image, a video, an icon, a symbol, etc.) to a user. For example, the display 160 can include a touch panel (i.e., touch screen). And, the display 160 can receive a touch, gesture, proximity, or hovering input that uses an electronic pen or a part of the user's body. For example, the display 160 can also include a pressure panel, and can receive a pressure input by a conductor (e.g., a part of the user's body) or a nonconductor.

The communication interface 170 can, for example, establish communication between the electronic device 101 and an external device (e.g., the 1st external electronic device 102, the 2nd external electronic device 104, or the server 106). For example, the communication interface 170 can be coupled to a network 161 through wireless communication or wired communication, and communicate with the external device (e.g., the 2nd external electronic device 104 or the server 106).

For instance, the wireless communication can include a cellular communication that uses at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc. For instance, the wireless communication 163 can include at least one of Wireless Fidelity (WiFi), Bluetooth (BT), Bluetooth Low Energy (BLE), Zigbee, Near Field Communication (NFC), Magnetic Secure Transmission (MST), Radio Frequency (RF), Body Area Network (BAN) or Global Navigation Satellite System (GNSS). For instance, the wired communication can include at least one of a Universal Serial Bus (USB), a High Definition Multimedia Interface (HDMI), Recommended Standard-232 (RS-232), Power Line Communication (PLC), Plain Old Telephone Service (POTS), etc. For instance, the network 161 can include at least one of a telecommunications network, for example, a computer network (e.g., a Local Area Network (LAN) or a Wide Area Network (WAN)), the Internet, or a telephone network.

Each of the first and second external electronic devices 102 and 104 may be a device which is the same as or different from the electronic device 101. According to an embodiment, the server 106 may include a group of one or more servers. According to one embodiment, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 1B:
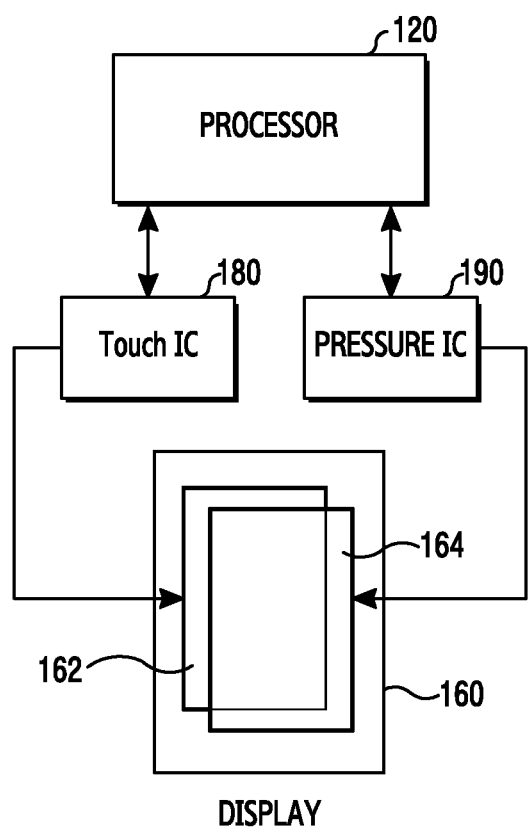
FIG. 1B illustrates a block diagram of an electronic device for processing input information according to one exemplary embodiment of the present disclosure.

FIG. 1B illustrates a block diagram of an electronic device for processing input information according to one exemplary embodiment of the present disclosure.

Referring to FIG. 1B, the display 160 of the electronic device 101 can include a display panel (not shown) displaying various content, a touch panel 162 recognizing a touch input and a pressure panel 164 recognizing a pressure input.

If a touch input is detected through the touch panel 162, the touch IC 180 can generate a touch event corresponding to a coordinate of the touch input and transmit the event to the processor 120. Therefore, the touch IC 180 can generate a touch event apart from a pressure IC 190.

If a pressure input is detected through the pressure panel 164, the pressure IC 190 can generate a pressure event corresponding to a coordinate of the pressure input and pressure information (e.g., a pressure strength) thereof and transmit the pressure event to the processor 120. For example, if the pressure input is detected through the pressure panel 164, the pressure IC 190 can generate a pressure event corresponding to at least one of a pressure coordinate and a pressure strength, via an interrupt for the pressure input that is transmitted to the processor 120. Therefore, the pressure IC 190 can generate the pressure event apart from the touch IC 180.

The processor 120 can match and process a touch event and a pressure event that are provided from the touch IC 180 and the pressure IC 190. For example, if the processor 120 is provided with generation information of a touch event or a pressure event from the touch IC 180 or the pressure IC 190, the processor 120 can control to perform an operation or function corresponding to the touch event or the pressure event for an application executing in the electronic device 101. As a part of that process, if the processor 120 is provided with the generation information of a touch event or a pressure event from the touch IC 180 and the pressure IC 190, the processor 120 can match the touch event and the pressure event. The processor 120 can control the application to perform an operation or function corresponding to the matched touch event and pressure event.

According to one exemplary embodiment of the present disclosure, the electronic device 101 can configure the touch IC 180 and the pressure IC 190 as one module.

Figure 2:
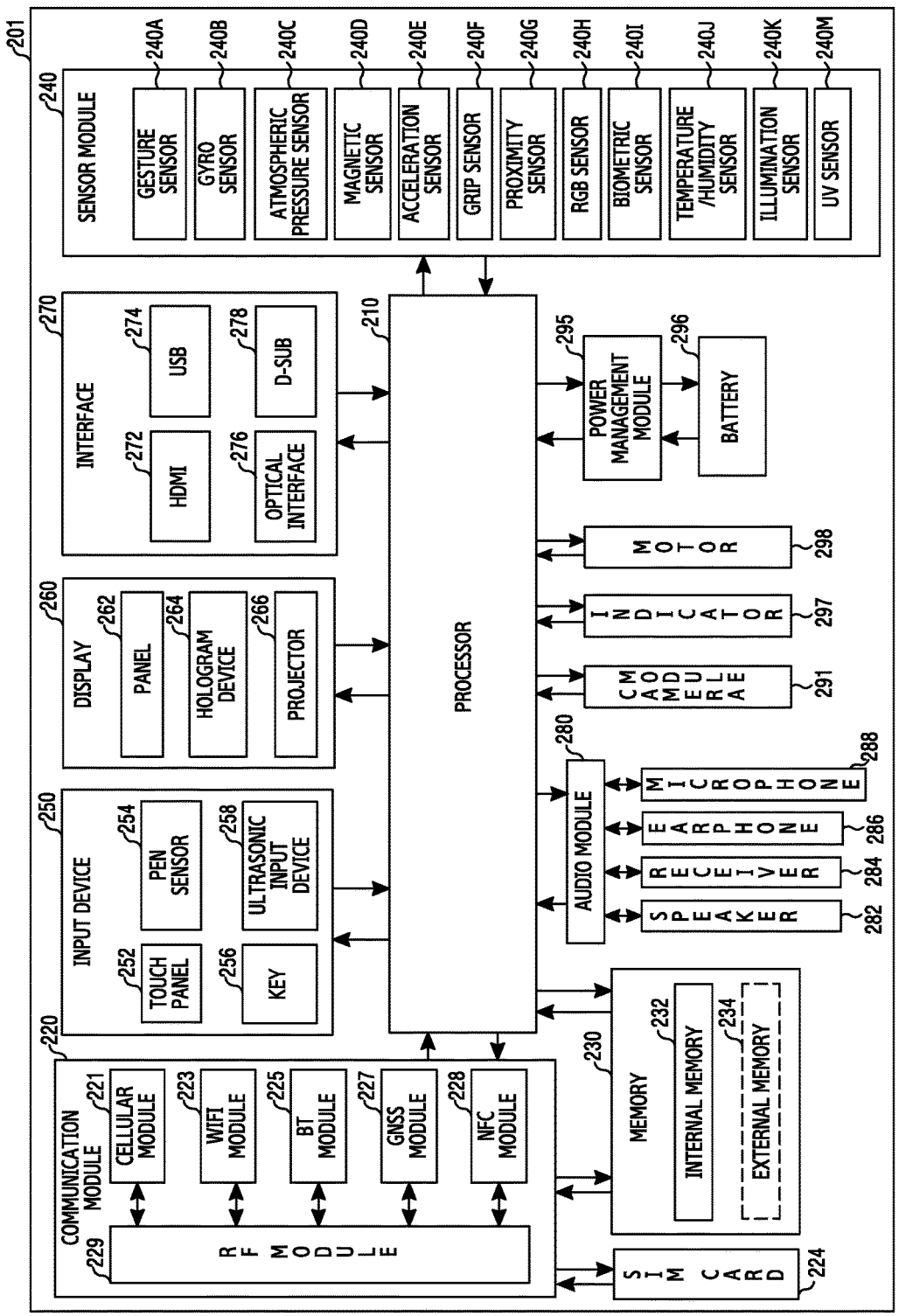
FIG. 2 illustrates a block diagram of an electronic device according to one exemplary embodiment of the present disclosure.

FIG. 2 illustrates a detailed block diagram of an electronic device according to an exemplary embodiment of the present disclosure. In the following description, the electronic device 201 may be, for example, the entire electronic device 101 illustrated in FIG. 1A or part of the electronic device 101.

Referring to FIG. 2, the electronic device 201 may include one or more processors (for example, an AP) 210, a communication module 220, a subscriber identity module (SIM) 224, a memory 230, a sensor module 240, an input device 250, a display 260, an interface 270, an audio module 280, a camera module 291, a power management module 295, a battery 296, an indicator 297, and a motor 298.

The processor 210 may run, for example, an operating system (OS) or application program to control a plurality of hardware or software components connected to the processors 210 and may perform various kinds of data processing and operations. The processors 210 may be configured, for example, as a system on chip (SoC). According to one exemplary embodiment, the processors 210 may further include a graphic processing unit (GPU) and/or an image signal processor. The processors 210 may include at least part (for example, a cellular module 221) of the components illustrated in FIG. 2. The processors 210 may load a command or data received from at least one of other components (for example, a nonvolatile memory) into a volatile memory to process the command or data and may store various kinds of data in the nonvolatile memory.

The communication module 220 may have a configuration the same as or similar to that of the communication interface 170 in FIG. 1A. The communication module 220 may include, for example, a cellular module 221, a Wi-Fi module 223, a Bluetooth module 225, a global navigation satellite system (GNSS) module 227 (for example, a global positioning system (GPS) module, a Glonass module, a Beidou module, or a Galileo module), a near field communication (NFC) module 228, and a radio frequency (RF) module 229.

The cellular module 221 may provide, for example, a voice call, a video call, a text message service, an Internet service, etc. through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP).

The Wi-Fi module 223, the BT module 225, the GNSS module 227, or the NFC module 228 may include, for example, a processor for processing data that is transmitted and received through the corresponding module. According to some embodiments, at least some (two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a power amplifier (amp) module (PAM), a frequency filter, a low noise amplifier (LNA), an antenna, or the like. According to another exemplary embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including an SIM and/or an embedded SIM and may include unique identification information (for example, an integrated circuit card identifier (ICCID)) or subscriber information (for example, an international mobile subscriber identity (IMSI)).

The memory 230 (for example, a memory 130) may include, for example, an internal memory 232 or an external memory 234. The internal memory 232 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable and programmable ROM (EPROM), an electrically erasable and a programmable ROM (EEPROM), a mask ROM, a flash ROM, a flash memory (for example, an NAND flash, an NOR flash, or the like), a hard drive, or a solid state drive (SSD)).

The external memory 234 may further include a flash drive, for example, a compact flash (CF), a secure digital (SD), a micro secure digital (micro-SD), a mini secure digital (mini-SD), an extreme digital (xD), a multi-media card (MMC), a memory stick, or the like. The external memory 234 may be functionally and/or physically connected to the electronic device 201 through various interfaces.

The sensor module 240 may measure, for example, physical quantities or detect an operation state of the electronic device 201 and convert measured or detected information into an electrical signal. The sensor module 240 may include, for example, at least one of a gesture sensor 240A, a gyro sensor 240B, a barometric pressure sensor 240C (atmospheric pressure sensor), a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, a illumination sensor 240K, a ultraviolet (UV) sensor 240M, and a galvanic skin reflex (GRS) sensor 240N. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a force touch sensor, an ultrasonic sensor, and/or a fingerprint sensor. The sensor module 240 may further include a control circuit to control at least one or more sensors belonging thereto. In one exemplary embodiment, the electronic device 201 may further include a processor configured, as a part of the processors 210 or separately from the processors 210, to control the sensor module 240, thereby controlling the sensor module 240 while the processors 210 is in a sleep state.

The input device 250 may include, for example, a touch panel 252, a (digital) pen sensor 254, a key 256, or an ultrasonic input device 258. The touch panel 252 may use, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or include a separate recognition sheet. The key 256 may include, for example, a physical button, an optical key, or a keypad. The ultrasonic device 258 may detect ultrasonic waves generated in an input tool through a microphone (for example, a microphone 288) and identify data corresponding to the detected ultrasonic waves.

The display 260 (e.g., the display 160) can include a panel 262, a hologram device 264, a projector 266, and/or a control circuit for controlling them. The panel 262 can, for example, be implemented to be flexible, transparent, or wearable. The panel 262 can be constructed as one or more modules together with the touch panel 252. According to one exemplary embodiment, the panel 262 can include a pressure sensor (or force sensor) capable of measuring pressure information (e.g., a pressure coordinate and a pressure strength) about a user's touch. The pressure sensor can be implemented in an integrated type with the touch panel 252, or be implemented as one or more sensors separate from the touch panel 252. The hologram device 264 can use the interference of light to show a three-dimensional image to the air. The projector 266 can project light onto a screen to display an image. The screen can, for example, be located inside or outside the electronic device 201. The interface 270 can, for example, include an HDMI 272, a USB 274, an optical interface 276, or a D-subminiature (D-sub) 278. The interface 270 can, for example, be included in the communication interface 170 illustrated in FIG. 1A. Additionally or alternatively, the interface 270 can, for example, include a Mobile High-definition Link (MHL) interface, an SD card/Multi Media Card (MMC) interface, or an Infrared Data Association (IrDA) standard interface.

The audio module 280 may convert, for example, a sound and an electrical signal reciprocally. At least some components of the audio module 280 may be included, for example, in an input/output interface 150 illustrated in FIG. 1a. The audio module 280 may process sound information input or output, for example, through a speaker 282, a receiver 284, earphones 286, or the microphone 288.

The camera module 291 is a device that takes, for example, a still image and a video. According to one exemplary embodiment, the camera module 291 may include one or more image sensors (for example, a front sensor or a rear sensor), a lens, an image signal processor (ISP), or a flash (for example, an LED, a xenon lamp, or the like).

The power management module 295 may manage, for example, the power of the electronic device 201. According to one exemplary embodiment, the power management module 295 may include a power management integrated circuit (PMIC), a charger integrated circuit (IC), or a battery or fuel gauge. The power management module 295 may be supplied with power from the outside via a cable and/or wirelessly. For example, the power management module 295 may be supplied with power from the outside using a wireless charging method, such as a magnetic resonance method, a magnetic induction method, or an electromagnetic wave method. The power management module 295 may further include an additional circuit, such as a coil loop, a resonance circuit, or a rectifier, to be supplied with power wirelessly. The battery gauge may measure, for example, the remaining battery charge, the charging voltage, the current, or temperature of the battery 296.

The battery 296 may include, for example, a rechargeable battery and/or a solar battery. According to one exemplary embodiment, the battery 296 may include a plurality of cells connectable in series or in parallel.

The indicator 297 may display a specific state of the electronic device 201 or a component thereof (for example, the processors 210), for example, a booting state, a message state, or a charging state. The motor 298 may convert an electrical signal into mechanical vibrations and may generate vibrations or a haptic effect. Although not shown, the electronic device 201 may include a processing device for supporting a mobile TV (for example, a GPU). The processing device for supporting the mobile TV may process media data in accordance with digital multimedia broadcasting (DMB), digital video broadcasting (DVB), or media-Flo™ standards.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3A:
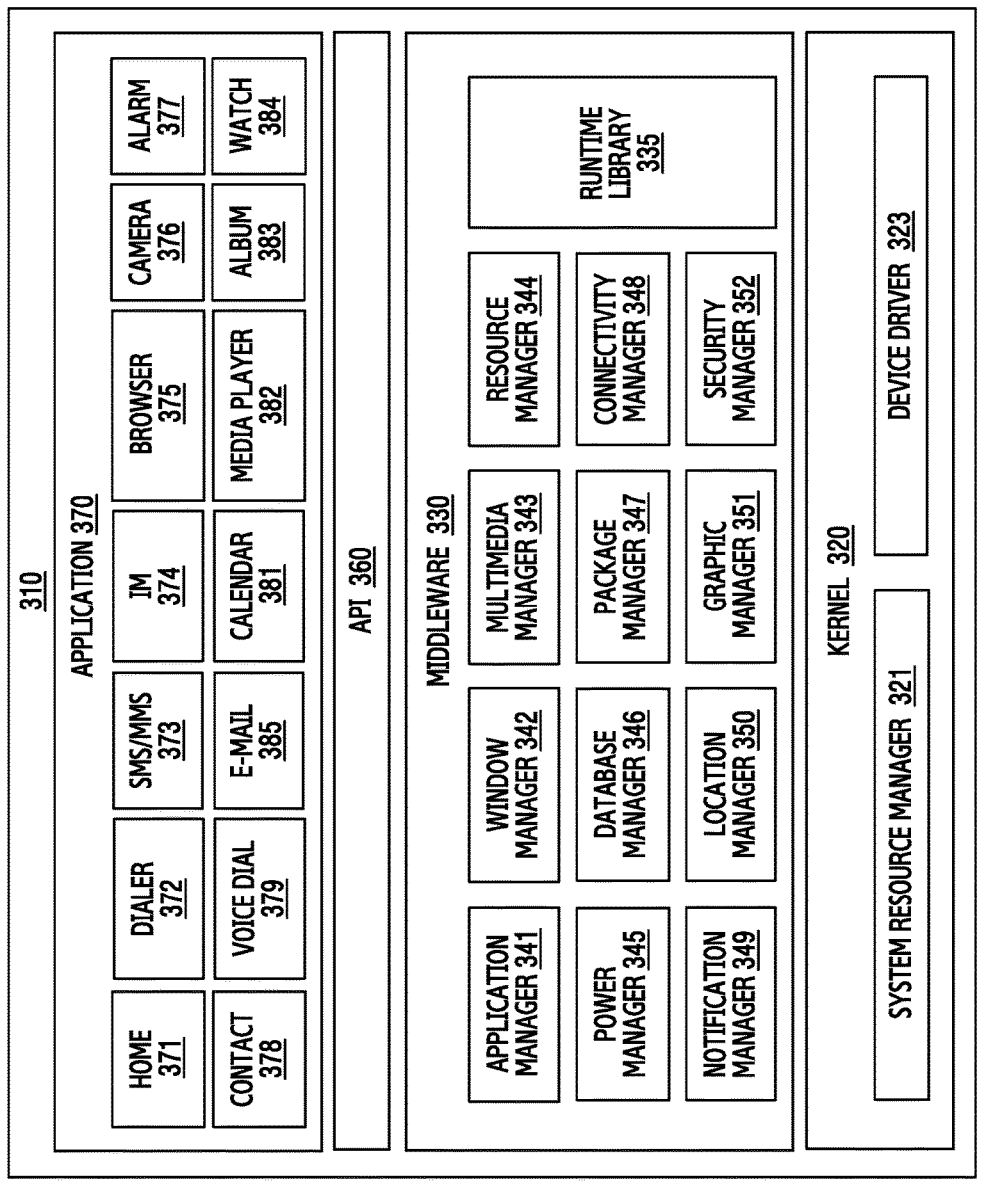
FIG. 3A illustrates a block diagram of a program module according to one exemplary embodiment of the present disclosure.

FIG. 3A is a block diagram of a program module according to one exemplary embodiment of the present disclosure.

According to one exemplary embodiment, the program module 310 (e.g., the program 140) can include an Operating System (OS) controlling resources related to an electronic device (e.g., the electronic device 101) and/or various applications (e.g., the application program 147) run on the operating system. The operating system can, for example, include Android™, iOS™, Windows™, Symbian™, Tizen™, or Bada™.

Referring to FIG. 3A, the program module 310 can include a kernel 320 (e.g., the kernel 141), a middleware 330 (e.g., the middleware 143), an API 360 (e.g., the API 145), and/or an application 370 (e.g., the application program 147). At least a part of the program module 310 can be preloaded onto the electronic device, or can be downloaded from an external electronic device (e.g., the electronic device 102 or 104, the server 106, etc.).

The kernel 320 can, for example, include a system resource manager 321 and/or a device driver 323. The system resource manager 321 can perform the control of system resources, the allocation thereof, or the recovery thereof. According to one exemplary embodiment, the system resource manager 321 can include a process management unit, a memory management unit, or a file system management unit. The device driver 323 can, for example, include a display driver, a camera driver, a Bluetooth driver, a shared memory driver, a USB driver, a keypad driver, a WiFi driver, an audio driver, or an Inter-Process Communication (IPC) driver. The middleware 330 can, for example, provide a function that the application 370 commonly needs, or provide various functions to the application 370 through the API 360 so that the application 370 may make use of restricted system resources within an electronic device. According to one exemplary embodiment, the middleware 330 can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 can, for example, include a library module that a compiler uses so as to add a new function through a programming language while the application 370 is executed. The runtime library 335 can perform input output management, memory management, or arithmetic function processing. The application manager 341 can, for example, manage a lifecycle of the application 370. The window manager 342 can manage a GUI resource that is used in a screen. The multimedia manager 343 can determine a format required for playing of media files, and perform the encoding or decoding of the media file by using a codec suitable for the corresponding format. The resource manager 344 can manage a source code of the application 370 or a space of a memory. The power manager 345 can, for example, manage a battery capacity or a power source, and provide power information required for an operation of an electronic device. According to one exemplary embodiment, the power manager 345 can interwork with a Basic Input/Output System (BIOS). The database manager 346 can, for example, generate, search or change a database that will be used in the application 370. The package manager 347 can manage the installation or updating of an application distributed in a form of a package file.

The connectivity manager 348 can, for example, manage wireless connectivity. The notification manager 349 can, for example, provide events such as an arrival message, an appointment, a proximity notification, etc. to a user. The location manager 350 can, for example, manage location information of an electronic device. The graphic manager 351 can, for example, manage a graphic effect that will be provided to the user, or a user interface related with this. The security manager 352 can, for example, provide system security or user authentication. According to one exemplary embodiment, the middleware 330 can include a telephony manager for managing a voice or video telephony function of the electronic device, or a middleware module capable of forming a combination of functions of the aforementioned constituent elements. According to one exemplary embodiment, the middleware 330 can provide a module that is specialized by operating system type. The middleware 330 can dynamically delete some of the existing constituent elements or add new constituent elements. The API 360 is, for example, a set of API programming functions, and can be provided to have another construction in accordance with an operating system. For example, Android or iOS can provide one API set by platform, and Tizen can provide two or more API sets by platform.

The application 370 can, for example, include a home 371, a dialer 372, a Short Message Service (SMS)/Multimedia Message Service (MMS) 373, an Instant Message (IM) 374, a browser 375, a camera 376, an alarm 377, a contact 378, a voice dial 379, an electronic mail (e-mail) 385, a calendar 381, a media player 382, an album 383, a watch 384, health care (e.g., measuring a momentum, a blood sugar, etc.), or an environment information (e.g., air pressure, humidity, temperature information) provision application. According to one exemplary embodiment, the application 370 can include an information exchange application capable of supporting information exchange between an electronic device and an external electronic device. The information exchange application can, for example, include a notification relay application for relaying specific information to the external electronic device, or a device management application for managing the external electronic device. For example, the notification relay application can relay notification information, which is generated in another application of the electronic device, to the external electronic device, or can receive notification information from the external electronic device and provide the received notification information to a user. The device management application can, for example, install, delete, or update a function (e.g., the turn-on/turn-off of the external electronic device itself or some constituent components thereof or the adjustment of a brightness or resolution of a display) of the external electronic device communicating with the electronic device, or an application operating in the external electronic device. According to one exemplary embodiment, the application 370 can include an application (e.g., a health care application of a mobile medical instrument) designated according to an attribute of the external electronic device. According to one exemplary embodiment, the application 370 can include an application received from the external electronic device. At least a part of the program module 310 can be implemented (e.g., executed) by software, firmware, hardware (e.g., the processor 210) or a combination of at least two or more of them, and can include a module for performing one or more functions, a program, a routine, sets of instructions, or a process.

Figure 3B:
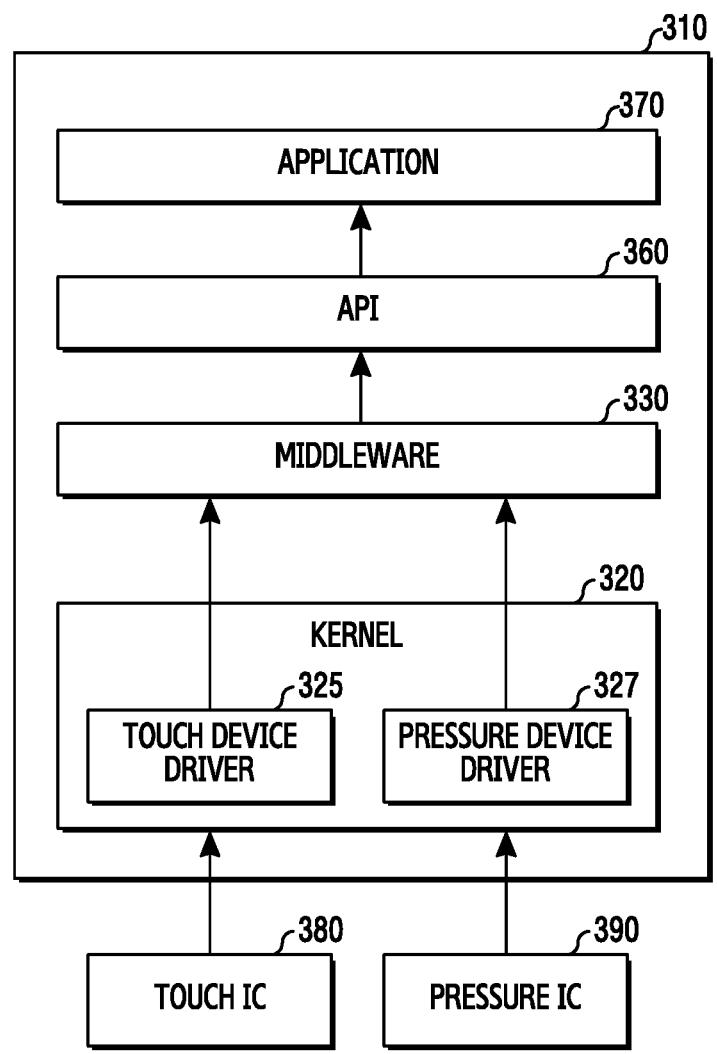
FIG. 3B illustrates a block diagram of a program module for processing input information according to one exemplary embodiment of the present disclosure.

FIG. 3B illustrates a block diagram of a program module for processing input information according to one exemplary embodiment of the present disclosure. The following description can represent a software data flow for a hardware configuration of the electronic device 101 of FIG. 1A.

According to one exemplary embodiment, the kernel 320 of the program module 310 can include a touch device driver 325 and a pressure device driver 327. For example, the touch device driver 325 can transmit a touch event (including a touch coordinate) that is transmitted by a touch IC 380 (e.g., the touch IC 180 of FIG. 1B), to an upper layer (e.g., middle ware 330). In addition, the pressure device driver 327 can transmit a pressure event (including a pressure coordinate and a pressure strength) transmitted by a pressure IC 390 (e.g., the pressure IC 190 of FIG. 1B), to the upper layer (e.g., middle ware 330).

The middleware 330 (e.g., framework) can transmit a touch event and a pressure event that are provided from the kernel 320 to an upper layer (e.g., the API 360 and/or the application 370). For example, if the middleware 330 is provided with a touch event or a pressure event from the kernel 320, the middleware 330 can transmit the touch event or the pressure event to the upper layer. For example, if the middleware 330 is provided with a touch event or a pressure event from the kernel 320, the middleware 330 can match the pressure event corresponding to the touch event. The middleware 330 can transmit the matched touch event and pressure event to the upper layer. The matched event may contain a touch coordinate and a pressure strength.

Alternatively, according to one exemplary embodiment of the present disclosure, the electronic device 101 can match a touch event and a pressure event in another part of the program module 310 such as the kernel 320, the API 360, or and the application 370. For example, the electronic device 101 can independently process the touch event and the pressure event, up to a layer matching the touch event and the pressure event.

Figure 4:
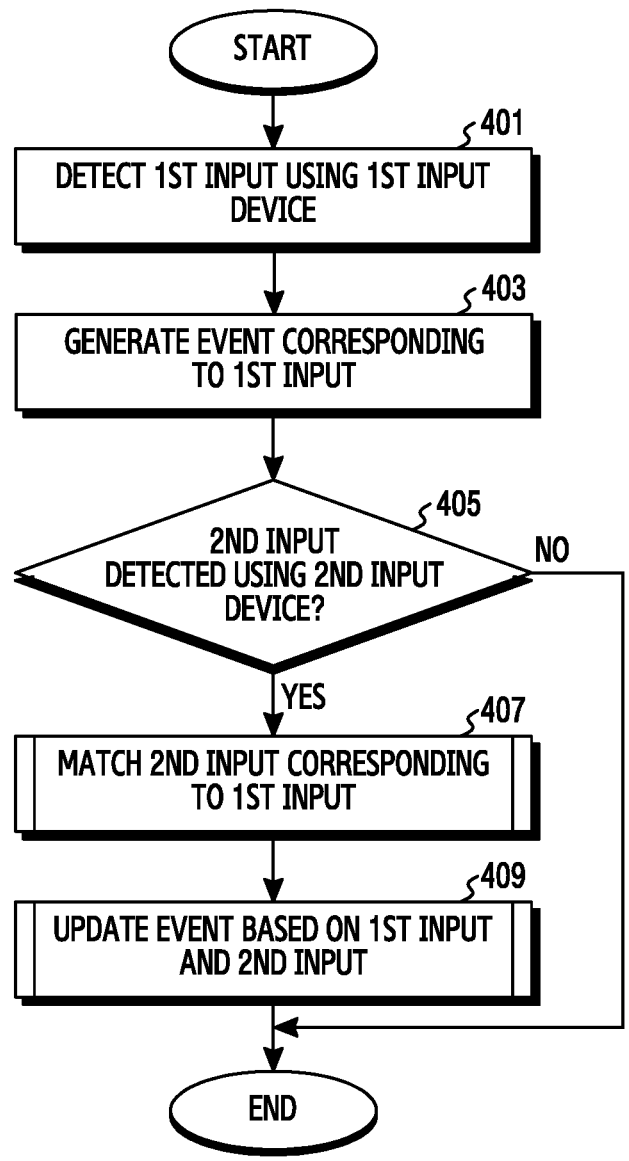
FIG. 4 illustrates a flowchart for processing an event corresponding to input information in an electronic device according to one exemplary embodiment of the present disclosure.

FIG. 4 illustrates a flowchart for processing an event corresponding to input information in an electronic device according to one exemplary embodiment of the present disclosure. In the following description, the electronic device can include the entire of the electronic device 101 of FIG. 1A or at least a part (e.g., the processor 120) thereof.

Referring to FIG. 4, in operation 401, the electronic device can detect a 1st input by a 1st input device of the electronic device. For example, the electronic device (e.g., the processor 120 or the electronic device 101) can detect a touch input by a touch device (e.g., the touch panel 162 of FIG. 1B). In addition, the electronic device (e.g., the processor 120 or the electronic device 101) can detect a pressure input by a pressure device (e.g., the pressure panel 164 of FIG. 1B).

In operation 403, the electronic device can generate an event corresponding to the 1st input that is detected by the 1st input device. For example, when the touch IC 180 of FIG. 1B detects a touch input using the touch panel 162, the touch IC 180 can generate a touch event corresponding to a touch coordinate. For example, when the pressure IC 190 of FIG. 1B detects a pressure input using the pressure panel 164, the pressure IC 190 can generate a pressure event corresponding to a pressure coordinate and a pressure strength. In this case, the processor 120 can control to perform an operation or function corresponding to the touch event or the pressure event for at least one application executing in the electronic device.

In operation 405, the electronic device can check if a 2nd input is detected through a 2nd input device while the 1st input is detected. For example, when the electronic device (e.g., the processor 120) detects a touch input in operation 401, the electronic device (e.g., the processor 120) can check if a pressure input is detected through the pressure panel 164 while the touch input is detected. Alternatively, when the electronic device (e.g., the processor 120) detects a pressure input in operation 401, the electronic device (e.g., the processor 120) can check if a touch input is detected through the touch panel 162 while the pressure input is detected.

If the electronic device detects the 2nd input through the 2nd input device while the 1st input is detected, in operation 407, the electronic device can match the 1st input and the 2nd input. For example, in case where the processor 120 detects one 1st input and one 2nd input, the processor 120 can determine that the corresponding inputs are matched. For example, in case where the processor 120 detects a plurality of 1st inputs and a plurality of 2nd inputs, the processor 120 can match the 1st inputs and the 2nd input based on distances between coordinates of the 1st inputs and coordinates of the 2nd inputs. For instance, the processor 120 can determine that inputs having the shortest interval between the input coordinates are matched. Additionally or alternatively, the processor 120 can match a 1st input with a 2nd input, if it is determined that other 1st inputs and 2nd inputs have already been matched.

In case where the electronic device matches the 1st input and the 2nd input, in operation 409, the electronic device can update an event corresponding to the 1st input, into an event corresponding to the 1st input and the 2nd input. For example, in case where the processor 120 matches a touch input and a pressure input, the processor 120 can generate an event corresponding to a touch coordinate of the touch input and a pressure strength of the pressure input. In this case, the processor 120 can control to perform an operation or function corresponding to the touch coordinate or the pressure strength of an application executing in the electronic device.

In case where the electronic device processes a touch input and a pressure event in accordance with various exemplary embodiments of the present disclosure, the touch input and the pressure input can have mutually different physical characteristics as in FIG. 5 below.

Figure 5:
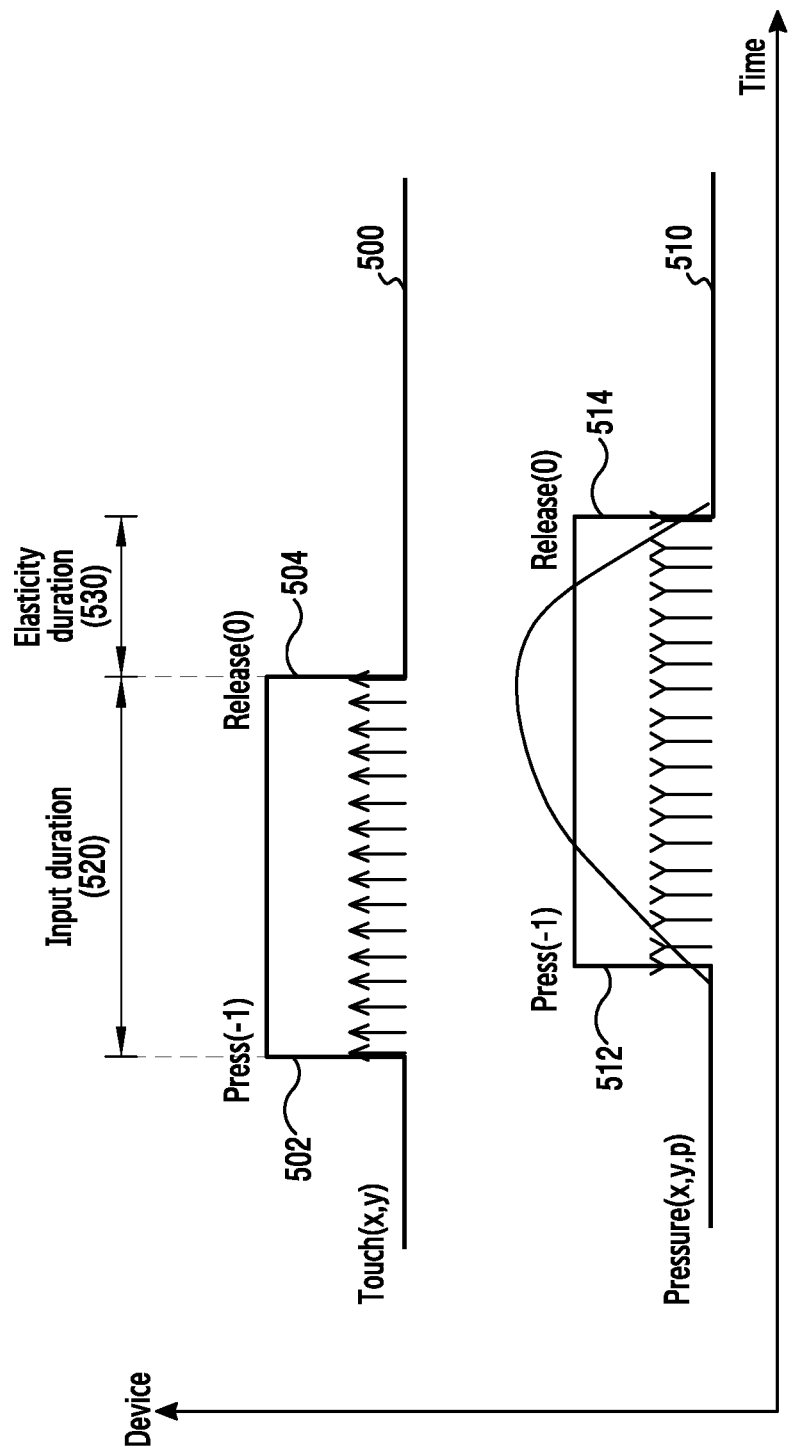
FIG. 5 illustrates a characteristic of input information according to one exemplary embodiment of the present disclosure.

FIG. 5 illustrates a characteristic of input information according to one exemplary embodiment of the present disclosure.

Referring to FIG. 5, the electronic device 101 can include a touch device and a pressure device for detecting a user input.

According to one exemplary embodiment, the touch device output 500 shows the detection of a touch input, from a time point 502 when a user comes in contact with the display 160 of the electronic device 101 via a conductor such as a part of the body or an electronic pen to a time point 504 when the user releases the conductor from the display 160. In this case, the electronic device can determine as a user input duration 520 a range of the time point 502 at which the user comes in contact with the display 160 to the time point 504 at which the user releases the contact. That is, the touch device (e.g., touch IC 180) can generate a touch event during the user input duration 520 and transmit the touch event to an upper layer (e.g. middleware).

According to one exemplary embodiment, the pressure device output 510 shows a pressure event that deviates in time from the user input duration 520, due to elastic characteristics of pressure devices. For example, a pressure input by a user can be gradually applied to the display 160 after the input means of the user comes in contact with the display 160 of the electronic device 101. Accordingly, detection by the pressure device is from a time point 512 that is delayed by a constant time interval from the time point 502. In that case, the pressure device (e.g., the pressure IC 190) generates a pressure event from the time point 512, and transmit the pressure event to the upper layer of the electronic device 101. Because the pressure device has elastic properties, when the input means releases contacting the display 160 of the electronic device 101, the pressure device can detect a pressure input for a constant time interval afterwards, until time point 514. The interval between time point 504 and 514 may be called an elasticity duration 530.

Figure 6:
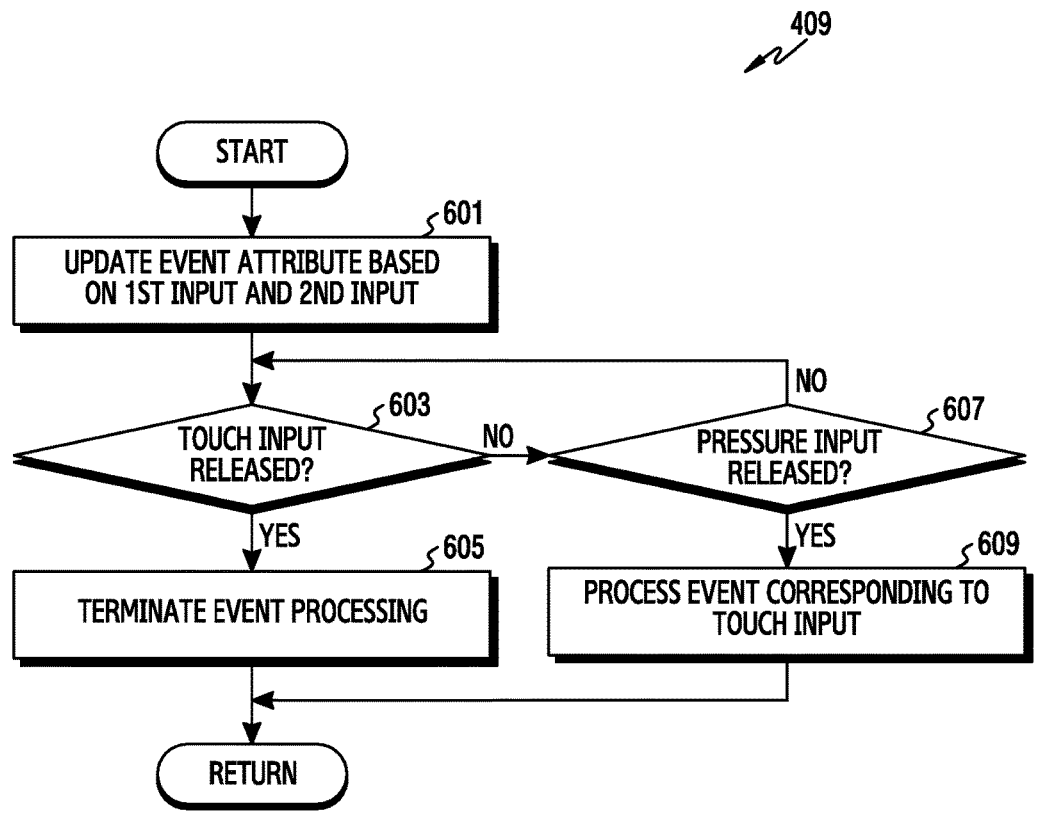
FIG. 6 illustrates a flowchart for processing a touch input and a pressure input in an electronic device according to one exemplary embodiment of the present disclosure.

According to one exemplary embodiment of the present disclosure, the electronic device can operate as in FIG. 6 to generate and process a matched event (unified event) using a touch device and a pressure device whose event occurrence time points are different.

Figure 7:
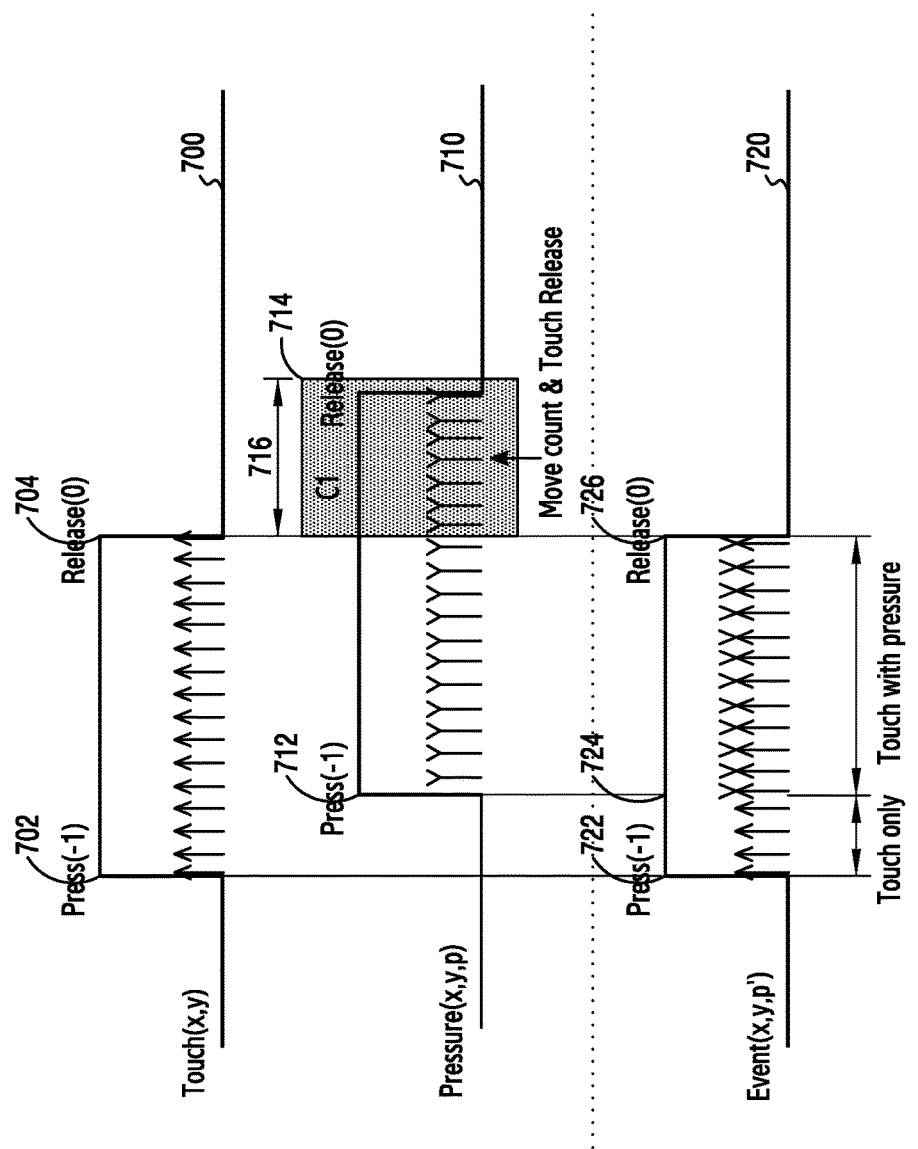
FIG. 7 illustrates an event processing timing diagram corresponding to a touch input and a pressure input in an electronic device according to one exemplary embodiment of the present disclosure.

FIG. 6 illustrates a flowchart for processing a touch input and a pressure input in an electronic device according to one exemplary embodiment of the present disclosure. FIG. 7 illustrates an event processing timing diagram corresponding to the touch input and the pressure input in the electronic device according to the one exemplary embodiment of the present disclosure. The following description is made for an operation for generating an event corresponding to a 1st input and a 2nd input, as shown in operation 409 of FIG. 4. In the following description, the electronic device can include the entire of the electronic device 101 of FIG. 1A or at least a part (e.g., the processor 120) thereof.

Referring to FIG. 6, when the electronic device matches a 1st input and a 2nd input (e.g., operation 407 of FIG. 4), in operation 601, the electronic device can update an event attribute from an event corresponding to the 1st input to an event corresponding to the 1st input and the 2nd input. For example, as shown in FIG. 7, when a touch input is detected by the touch panel 162 at time 702, the processor 120 can control an operation and function of an application, based on a touch event transmitted (or generated) by the touch IC 180 (duration 722 to 724). If a pressure input is detected by the pressure panel 164 while the touch input is detected at time 712, the processor 120 can update an event attribute to match the touch input and the pressure input. For instance, the processor 120 can control an operation and function of an application based on an event corresponding to a coordinate of a touch input and a pressure strength of a pressure input that matches with the touch input (duration 724-726).

In operation 603, the electronic device can check if the touch input is released (e.g. if the input means have been removed from the display 160) during the time when the electronic device is processing the event corresponding to the 1st input and the 2nd input. For example, as in FIG. 7, the processor 120 can check if the touch event is not generated by the touch IC 180 when touch is released at time 704, due to the contact release of the input means from the display 160.

If the touch input is released, in operation 605, the electronic device can terminate the event processing corresponding to at least one input among the 1st input and the 2nd input. For example, as in FIG. 7, if the touch input is not detected by the touch device (at time 704 as shown in the touch device output 700), the processor 120 can determine that the contact of the input means with the display 160 is released. In this case, even if a pressure input is detected (duration 716), the processor 120 can restrict event processing of the pressure input during the duration 716. For instance, the processor 120 can restrict the use of a pressure event generated in the pressure IC 190. For instance, the processor 120 can control the pressure IC 190 such that the pressure event is not generated in the pressure IC 190 during the duration 716.

In operation 607, the electronic device can check if the pressure input is released during the time when the electronic device is processing the event corresponding to the 1st input and the 2nd input. For example, the processor 120 can check if the pressure event is not generated through the pressure IC 190.

If the pressure input is not released, the electronic device can return to operation 603.

If the pressure input is released, in operation 609, the electronic device can process the event corresponding to the touch input. For example, if the pressure event is no longer detected by the pressure IC 190 at time 714, the processor 120 can performed an operation or function of an application based on the event corresponding to the touch input.

Figure 8:
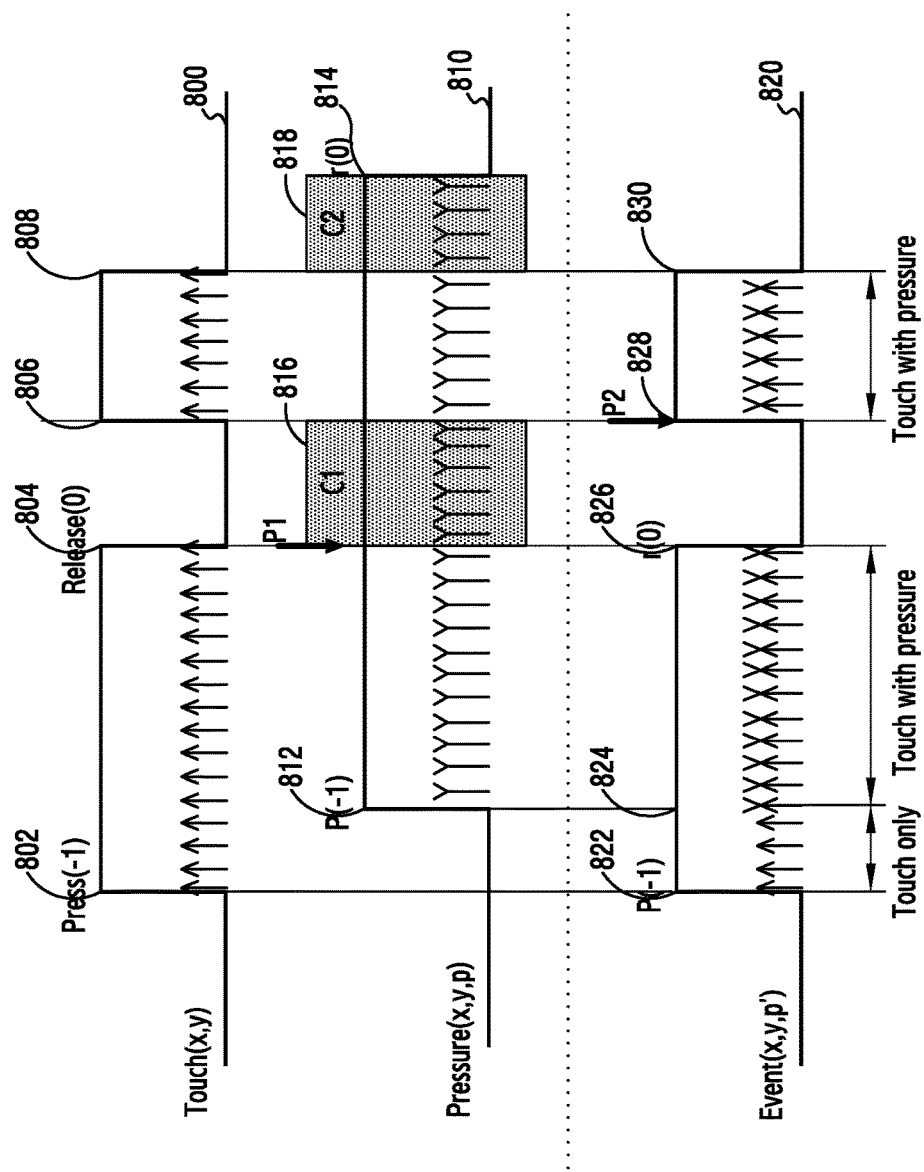
FIG. 8 illustrates an event processing timing diagram corresponding to a continuous touch input and pressure input in an electronic device according to one exemplary embodiment of the present disclosure.

FIG. 8 illustrates an event processing timing diagram corresponding to a continuous touch input and pressure input in an electronic device according to one exemplary embodiment of the present disclosure. The following description is made for an operation as shown in operation 409 of FIG. 4, where a touch input and a pressure input continuously take place and thus continuously generates events corresponding to a 1st input and a 2nd input.

According to one exemplary embodiment, a touch device output 800 shows a touch input detected by the touch panel 162 from a time point 802 when the user comes in contact with the display 160 of the electronic device 101 using a conductible input means. For example, the touch device (e.g., the touch IC 180) can generate a touch event corresponding to a touch input (e.g., a touch coordinate) from the time point 802, when it detects the touch input using the touch panel.

According to one exemplary embodiment, when a pressure event does not occur in the pressure device output 810 at time 802, the processor 120 can process a touch event generated in the touch device (at time 822). For example, the processor 120 can transmit a touch event generated in the touch device to the application 370 of the program module 310 and perform a function or operation corresponding to the touch event.

According to one exemplary embodiment, when the pressure device (e.g., the pressure IC 190) detects a pressure input by the pressure panel 164 (at time 812 in the pressure device output 810), the pressure device can generate a pressure event corresponding to the pressure input (e.g., a pressure coordinate and a pressure strength).

According to one exemplary embodiment, if the processor 120 is provided with a pressure event from the pressure device while also receiving a touch event (for example at time 812), the processor 120 can generate and process an event corresponding to the touch event and the pressure event (at time 824). For example, if the processor 120 detects a pressure input in course of the touch event processing, the processor 120 can determine a touch input matched with the pressure input. The processor 120 can control to transmit event occurrence information (e.g., touch coordinate and pressure strength) corresponding to the touch input matched with the pressure input, to the application 370, and perform a function or operation corresponding to the corresponding event.

According to one exemplary embodiment, if the contact of the input means with the display 160 is released (at time 804), the touch device can terminate the generation of the touch event corresponding to the touch input. In this case, the processor 120 can determine that a user's touch input has released, and terminate event processing by the touch input and the pressure input (at time 826). For instance, even if a pressure event is generated by the pressure device from the time point 804, the processor 120 can terminate the event processing during duration C1 816. Additionally or alternatively, the processor 120 can control the pressure device such that an interrupt by a pressure input is not generated after the time point 804, when the generation of the touch event is terminated.

According to one exemplary embodiment, the touch device can again detect a touch input through the touch panel 162 from a time point 806, when the user re-establishes contact with the display 160 of the electronic device 101 using the conductible input means. In that case, the touch device (e.g., touch IC 180) can again generate a touch event corresponding to a touch input from the time point 806.

According to one exemplary embodiment, the processor 120 can further process an event at time 828 and control a function or operation of an application based on this further event. For example, if a pressure input is detected at a time point 806, the processor 120 can generate and process an event corresponding to the touch event and the pressure event (for time 828 to 830). For example, if a pressure input is detected at the time point 806, the processor 120 may detect that the strength of the pressure input has changed. For instance, if the strength of the pressure input decreases, the processor 120 can determine that a pressure event of a new input does not take place, and process the touch event accordingly. As another example, if the strength of the pressure input increases, the processor 120 can determine that the pressure event of the new input take place, and generate and process the event corresponding to the touch event and the pressure event accordingly. For example, if the pressure event is not generated at the time point 806, the processor 120 can process only the touch event (not shown in FIG. 8).

According to one exemplary embodiment, in case where the contact of the input means with the display 160 is again released (at time 808), the touch device can terminate the generation of the touch event corresponding to the touch input. In this case, the processor 120 can determine that a user's input is released, and terminate event processing by the touch input and the pressure input (at time 830). For instance, even if a pressure event is generated by the pressure device from a time point 808, the processor 120 can terminate the event processing during the duration C2 818.

Figure 9:
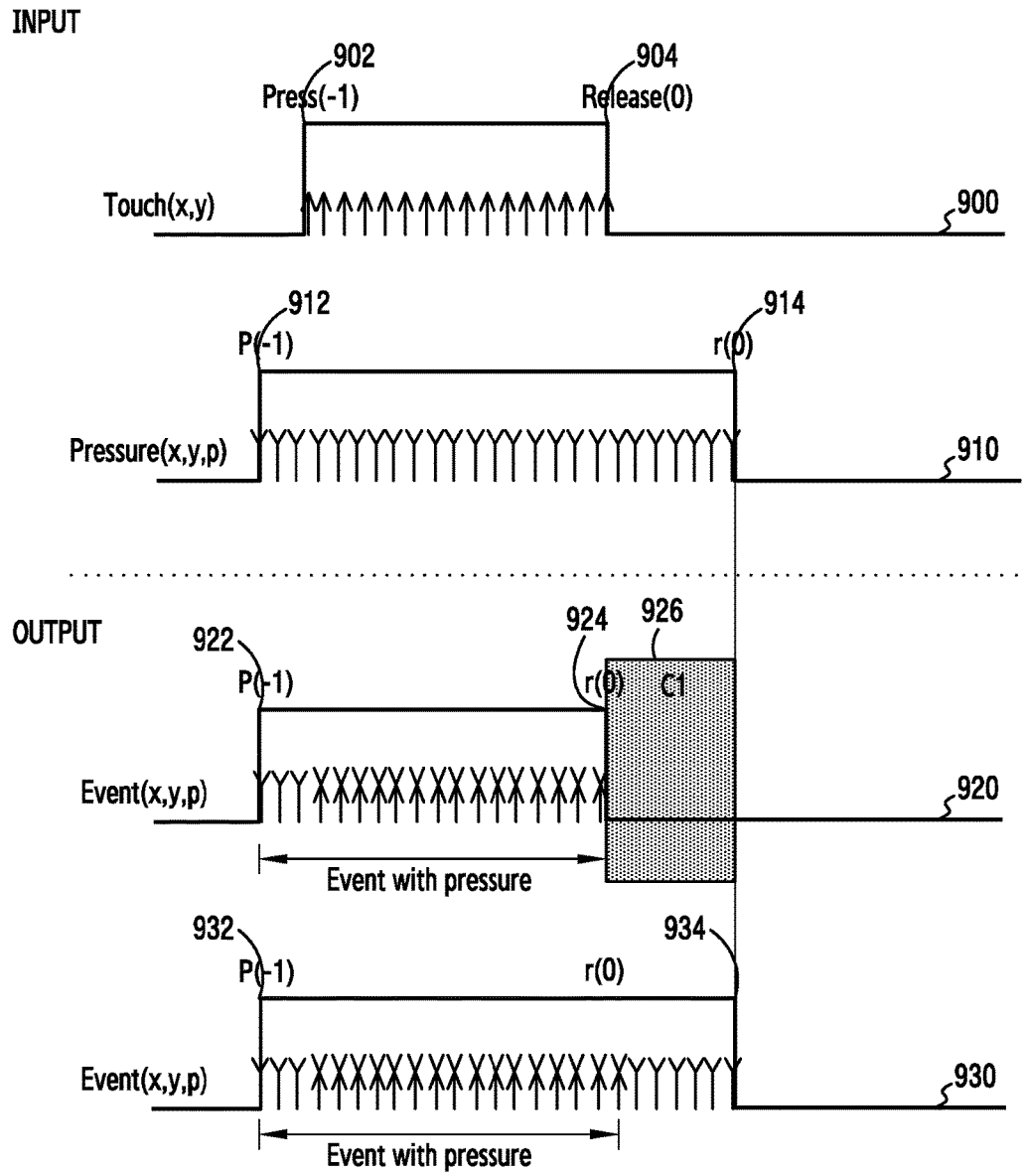
FIG. 9 illustrates another event processing timing diagram corresponding to a pressure input and a touch input in an electronic device according to one exemplary embodiment of the present disclosure.

FIG. 9 illustrates event processing timing diagram corresponding to a pressure input and a touch input in an electronic device according to one exemplary embodiment of the present disclosure. The following description is made for an operation for generating an event corresponding to a 1st input and a 2nd input when an input detection time point of a pressure device is earlier than an input detection time point of a touch device.

According to one exemplary embodiment, if a pressure device (e.g., the pressure IC 190) detects a pressure input using the pressure panel 164 (912), the pressure device can generate a pressure event corresponding to the pressure input (e.g., a pressure coordinate and a pressure strength), as shown by the pressure device output 910.

According to one exemplary embodiment, if a touch event does not take place in a touch device at time 912, the processor 120 can process a pressure event generated in the pressure device for time 922 and 932. For example, the processor 120 can control to transmit a pressure event generated in the pressure device to the application 370 of the program module 310, and perform a function or operation corresponding to the pressure event.

According to one exemplary embodiment, if the touch device detects a touch input by the touch panel 162 at time 902, the touch device can generate a touch event corresponding to the touch input (e.g., touch coordinate), as shown by the touch device output 900.

According to one exemplary embodiment, if the processor 120 is provided with a touch event from the touch device during the time when the pressure input is detected, for example at time 902, the processor 120 can generate and process an event corresponding to the touch event and the pressure event. For example, if the processor 120 detects a touch input, the processor 120 can determine that the pressure input is matched with the touch input, based on a distance between the corresponding touch coordinate and pressure coordinate. The processor 120 can control to transmit the event (e.g., a touch coordinate and a pressure strength) to the application 370, and perform a function or operation corresponding to the event.

According to one exemplary embodiment, if a touch input with the display 160 is released (at time 904), the touch device can terminate the generation of a touch event corresponding to a touch input. In this case, the processor 120 can determine that a user's input is released, and terminate event processing of the touch input and the pressure input (at time 924). For instance, even if pressure event is being generated at time 904, the processor 120 can terminate the event processing during the duration C1 926.

According to one exemplary embodiment, if a touch input with the display 160 is released (at time 904), the processor 120 can process a pressure event 930 generated by the pressure device. For example, if the generation of the touch event by the touch device is terminated at time 904, the processor 120 can check if the pressure event by the pressure device is generated. If so, the processor 120 can control to transmit the pressure event to the application 370, and perform a function or operation corresponding to the pressure event.

Figure 10:
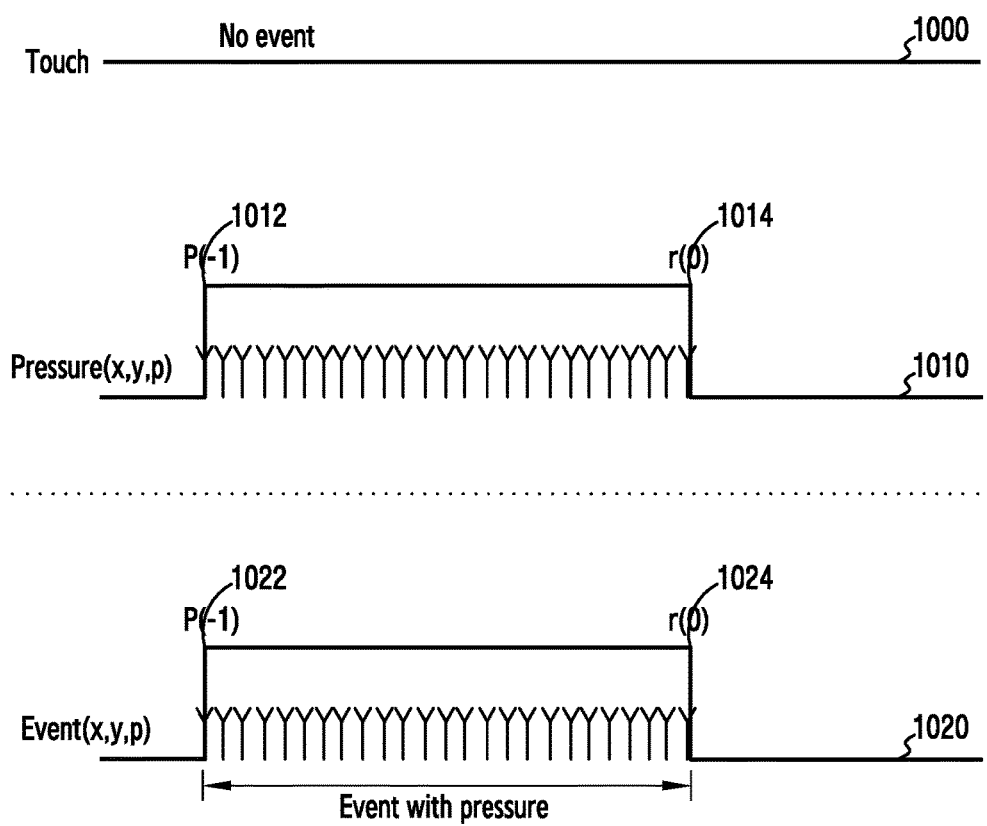
FIG. 10 illustrates another event processing timing diagram corresponding to a pressure input in an electronic device according to one exemplary embodiment of the present disclosure.

FIG. 10 illustrates another event processing timing diagram corresponding to a pressure input in an electronic device according to one exemplary embodiment of the present disclosure. The following description is made for an operation for processing a pressure event, as shown in operation 403 of FIG. 4.

According to one exemplary embodiment, in case where a pressure device (e.g., the pressure IC 190) detects a pressure input using the pressure panel 164 (at time 1012 as shown in pressure device output 1010), the pressure device can generate a pressure event corresponding to the pressure input (e.g., a pressure coordinate and a pressure strength).

According to one exemplary embodiment, when a touch event of a touch device does not occur and a pressure event occurs, the processor 120 can process the pressure event generated in the pressure device (at time 1022 to 1024). For example, if the display 160 comes in contact with an input means of nonconductor (insulator) materials such as wooden chopsticks or gloves, the electronic device 101 cannot detect a touch input. Accordingly, the processor 120 can control to transmit a pressure event corresponding to a pressure input by the nonconductive input means, to the application 370, and perform a function or operation corresponding to the pressure event. For example, when it is determined that the electronic device 101 is inundated (e.g. submerged in water), the electronic device 101 high sets a criterion value for touch recognition and thus cannot detect a touch input. Accordingly, the processor 120 can process a pressure event corresponding to a pressure input that is detected through the pressure device, as shown in pressure device output 1010. For instance, the inundation of the electronic device 101 can include a state in which the electronic device 101 cannot generate a touch event by the touch device 1000 because the electronic device 101 is located under water.

Figure 11:
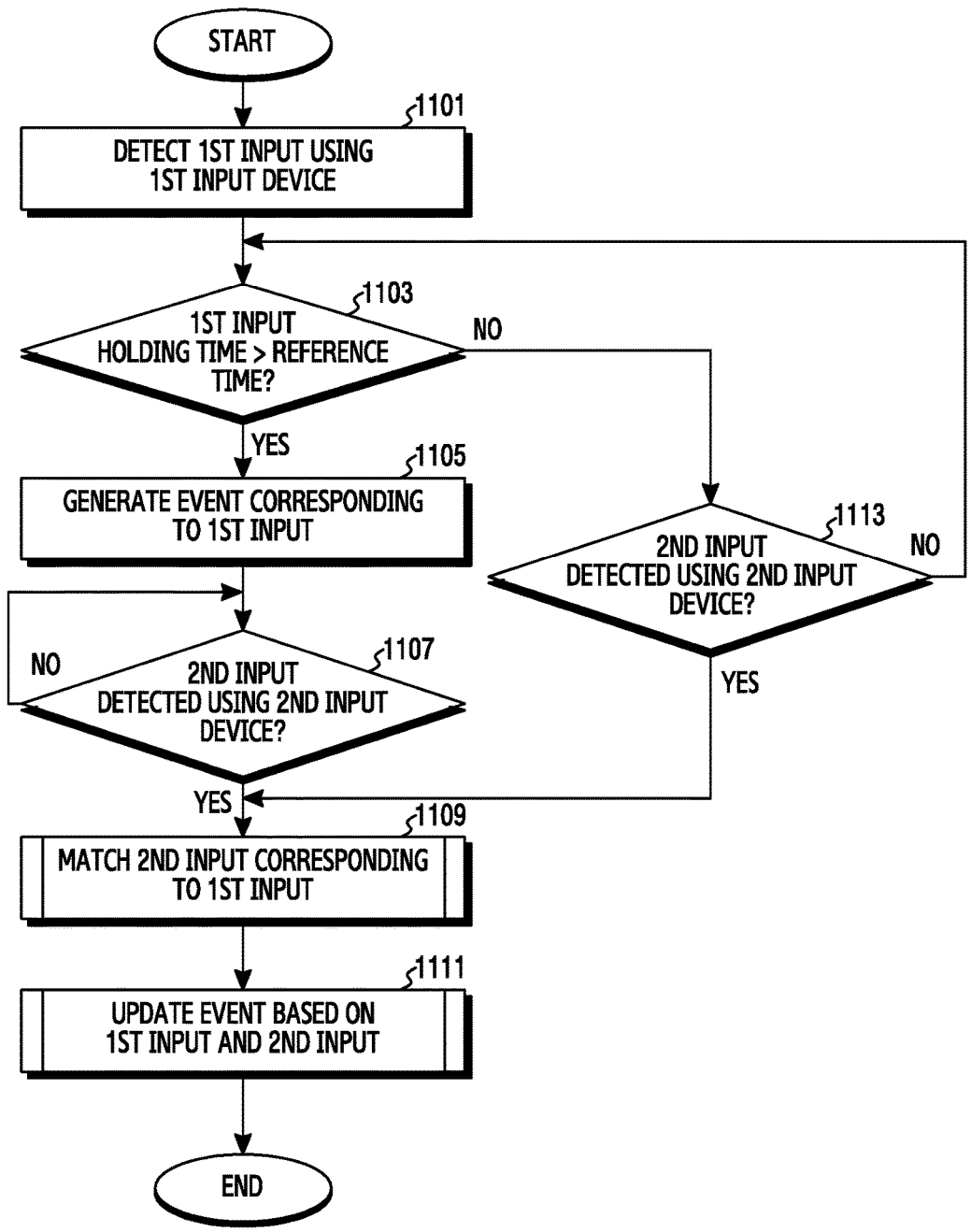
FIG. 11 illustrates a flowchart for processing an event on inputs that are detected through different input devices in an electronic device according to one exemplary embodiment of the present disclosure.
Figure 12:
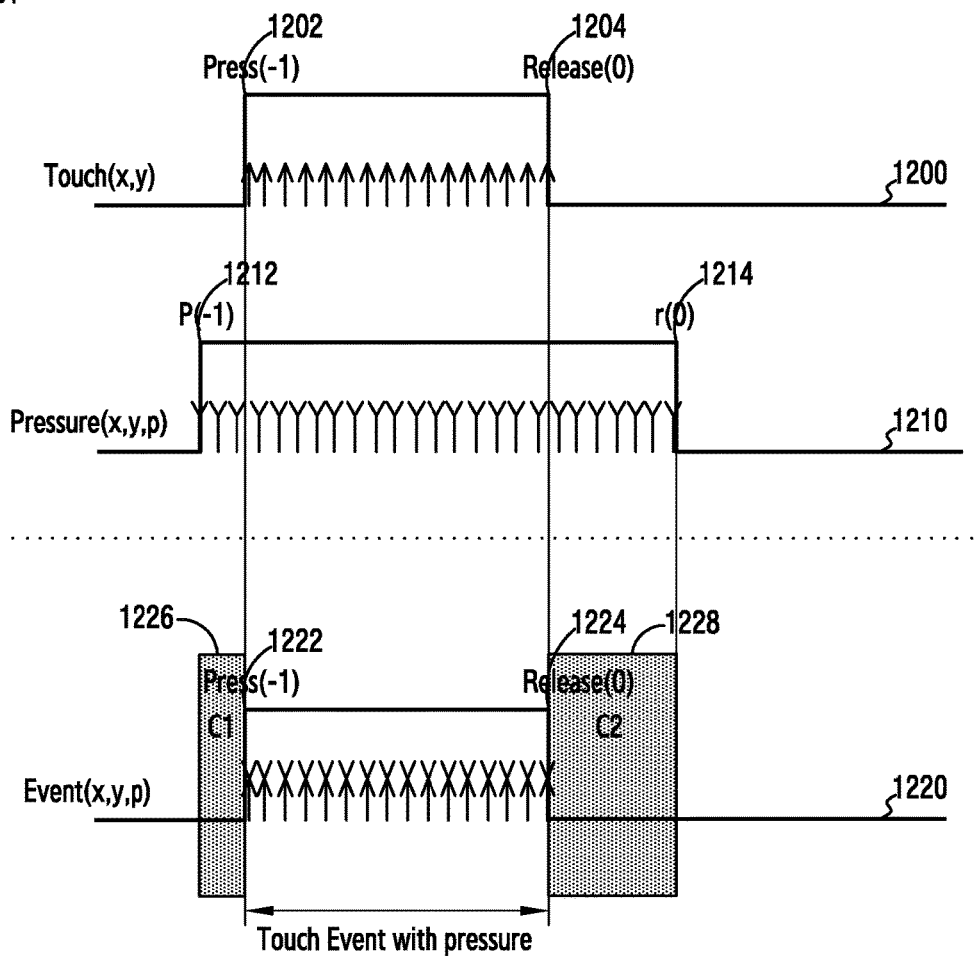
FIG. 12 illustrates another event processing timing diagram corresponding to a pressure input and a touch input in an electronic device according to one exemplary embodiment of the present disclosure.

FIG. 11 illustrates a flowchart for processing an event on inputs that are detected through different pressure devices in an electronic device according to one exemplary embodiment of the present disclosure. FIG. 12 illustrates another event processing timing diagram corresponding to a pressure input and a touch input in an electronic device according to one exemplary embodiment of the present disclosure. In the following description, the electronic device can include the entire of the electronic device 101 of FIG. 1A or at least a part (e.g., the processor 120) thereof.

Referring to FIG. 11, in operation 1101, the electronic device can detect a 1st input using a 1st input device of the electronic device. For example, as shown in FIG. 12, the electronic device (e.g., the processor 120) can detect a pressure input through a pressure device (e.g., the pressure panel 164 of FIG. 1B), as shown in pressure device output 1210 at time 1212.

If the electronic device detects the 1st input using the 1st input device, in operation 1103, the electronic device can check if the 1st input is detected for a holding time that exceeds a reference time. For instance, the reference time can be an interval that elapses before the electronic device check if another input is detected through another input device. The reference time interval may be based on a difference in time in the initial detection of inputs by the different input devices. For example, as explained above, due to the elastic properties of the pressure input device, it may detect a pressure input at a later time than when the touch input device detects a touch input. Accordingly, the reference time interval may be set to account for this difference.

If the 1st input holding time that is detected through the 1st input device exceeds the reference time, in operation 1105, the electronic device can generate an event corresponding to the 1st input. For example, when a pressure input that is detected through the pressure panel 164 is held for the reference time interval, the pressure IC 190 of FIG. 1B can generate a pressure event corresponding to a pressure coordinate and a pressure strength. In this case, the processor 120 can control to perform an operation or function corresponding to the pressure event through at least one application.

In operation 1107, the electronic device can check if a 2nd input is detected by a 2nd input device during a time when the 1st input is detected. For example, the processor 120 can check if a touch event generated in a touch device is detected in course of processing of a pressure event generated through a pressure device, when the pressure input is being detected.

If the 2nd input is not detected by the 2nd input device, the electronic device can continuously or periodically check if the 2nd input is detected.

If the electronic device detects the 2nd input using the 2nd input while also detecting the 1st input, in operation 1109, the electronic device can match the 1st input with the 2nd input. For example, if the processor 120 detects a touch input while a pressure input is detected, the processor 120 can match the pressure input and the touch input, based on a space interval between a pressure coordinate and a touch coordinate. For instance, the processor 120 can determine that the pressure input and the touch input having the shortest interval between a pressure coordinate and a touch coordinate are matched.

When the electronic device matches the 1st input and the 2nd input, in operation 1111, the electronic device can update the event corresponding to the 1st input into an event corresponding to the 1st input and the 2nd input. For example, in case where the processor 120 matches the touch input and the pressure input, the processor 120 can generate an event corresponding to a touch coordinate of the touch input and a pressure strength of the pressure input that is matched with the touch input. Then, the processor 120 can transmit the event corresponding to the touch input and the pressure input to the application 370, to perform a function corresponding to the event.

If the holding time of the 1st input is equal to or is less than the reference time, in operation 1113, the electronic device can check if a 2nd input is detected by the 2nd input device while the 1st input is detected. For example, the processor 120 can check if a touch event generated in the touch device is detected while the pressure input is also detected.

If the 2nd input is not detected by the 2nd input device, in operation 1103, the electronic device return to operation 1103.

If the electronic device detects the 2nd input by the 2nd input device while the 1st input is detected, in operation 1109, the electronic device can match the 1st input and the 2nd input. For example, in case where the processor 120 detects one touch input by the touch device and detects one pressure input through the pressure device, the processor 120 can determine that the corresponding touch input and pressure input are matched.

When the electronic device matches the 1st input and the 2nd input, in operation 1111, the electronic device can generate and process an event corresponding to the 1st input and the 2nd input. For example, the processor 120 can generate an event corresponding to a touch input and a pressure input from a time point 1202 of detecting a touch input and a pressure input. That is, the processor 120 can restrict event processing for the duration C1 1226 of the pressure event when touch input is not received.

According to one exemplary embodiment, if the release of the touch input is detected through the touch device (at time 1204), the electronic device can terminate event processing by the touch input and the pressure input (at time 1224). For instance, even if a pressure event is generated by the pressure device at time point 1204, the processor 120 can terminate the event processing for the duration C2 1228.

As described above, the electronic device automatically recognizes the characteristic of an input depending on whether the input is a pressure input or a touch input or both, without the user manually changing the input mode to select an input device. The electronic device disclosed herein thereby allows for better processing of an input event by the user, as shown in FIG. 13.

Figure 13:
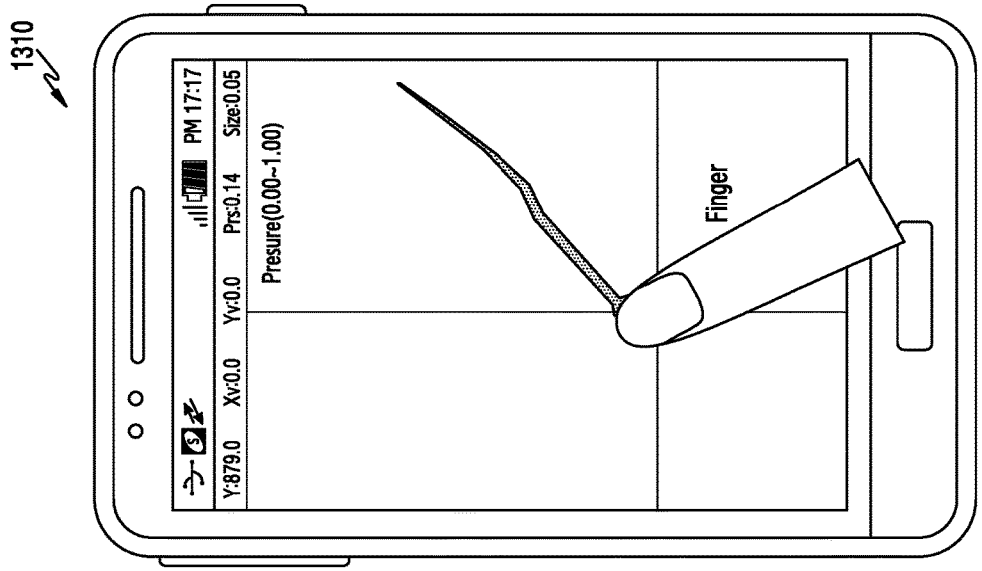
FIG. 13 illustrates an event processing screen corresponding to a touch input or a pressure input in an electronic device according to one exemplary embodiment of the present disclosure.
Figure 13:
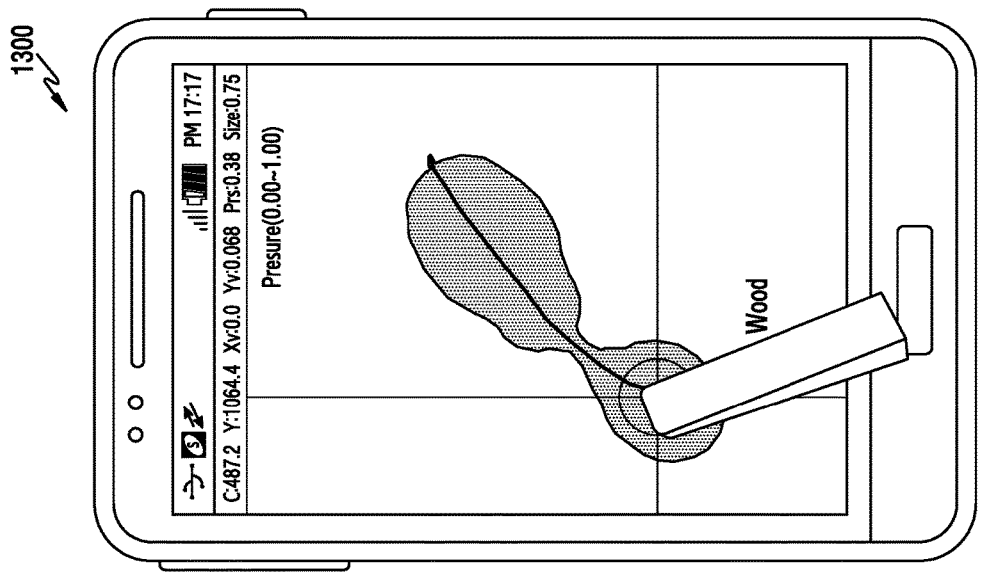

FIG. 13 illustrates an event processing screen corresponding to a touch input or a pressure input in an electronic device according to one exemplary embodiment of the present disclosure.

According to one exemplary embodiment, if a user uses a nonconductive input means such as wooden chopsticks, the electronic device can detect a pressure input using a pressure device. Accordingly, the electronic device can process an event corresponding to the pressure input for an application (as shown at 1300). For instance, the pressure input can include at least one of a pressure coordinate and a pressure strength.

According to one exemplary embodiment, if a user uses a conductive input means such as a part (e.g., finger) of the body, the electronic device can detect a touch input or a touch input and pressure input through a touch device. Accordingly, the electronic device can process an event corresponding to the touch input or the touch input and pressure input for an application (as shown at 1310).

According to one exemplary embodiment, if a user uses a conductive input means such as a part (e.g., finger) of the body, the electronic device can detect a touch input and a pressure input through a touch device and a pressure device. Accordingly, the electronic device can process an event corresponding to the touch input and the pressure input through an application (1310).

Figure 14:
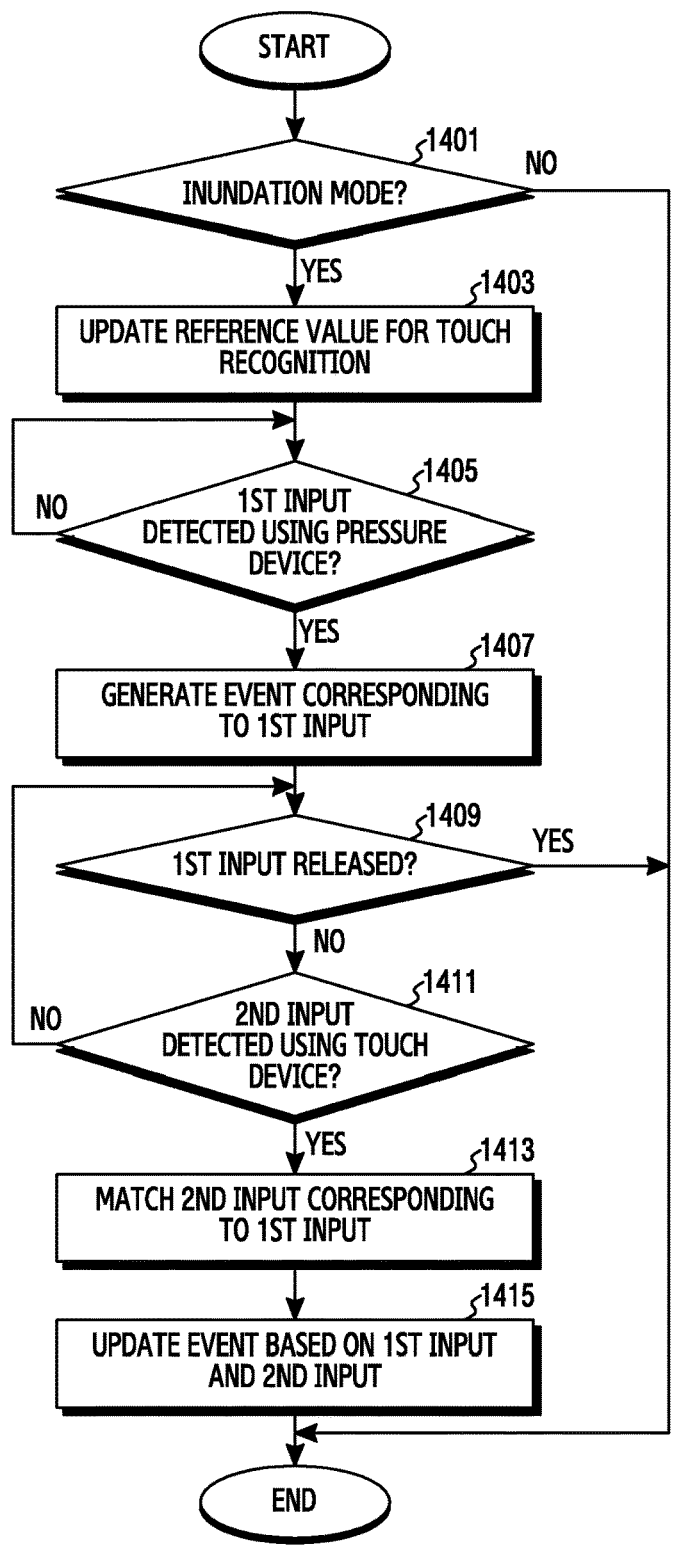
FIG. 14 illustrates a flowchart for processing an event corresponding to a pressure input and a touch input in an inundation mode in an electronic device according to one exemplary embodiment of the present disclosure.
Figure 15A:
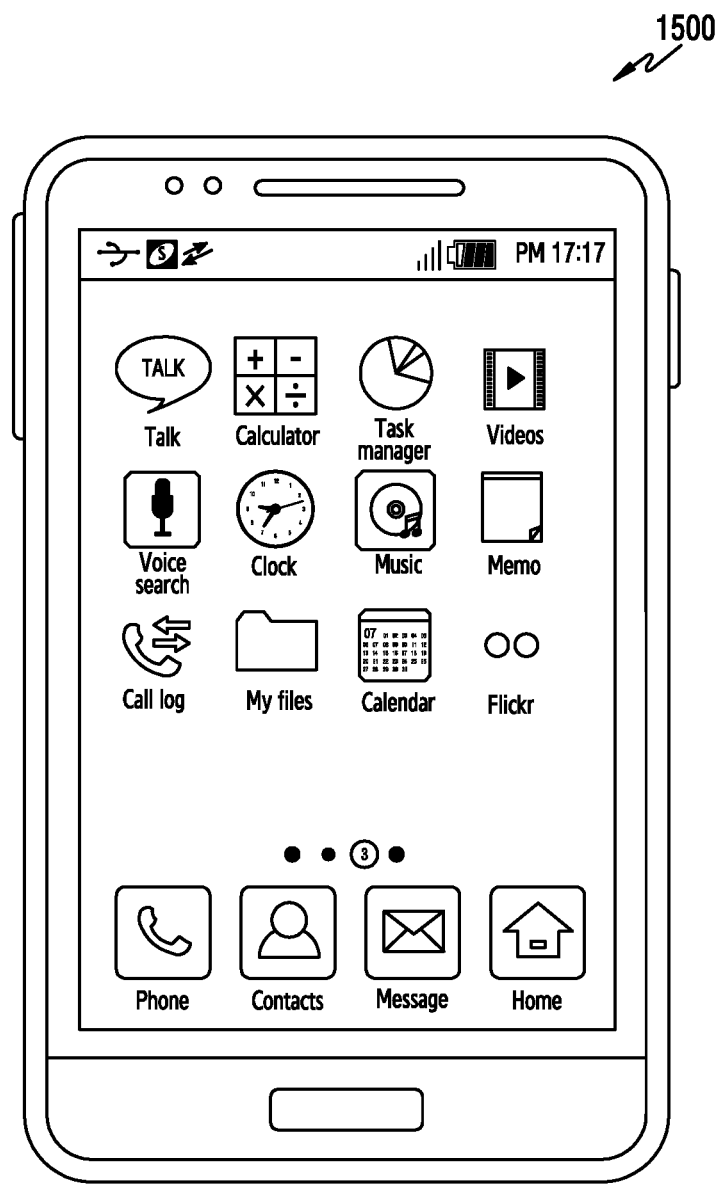
FIG. 15A, FIG. 15B and FIG. 15C illustrate screen configurations according to an inundation mode in an electronic device according to one exemplary embodiment of the present disclosure.
Figure 15B:
Figure 15C:
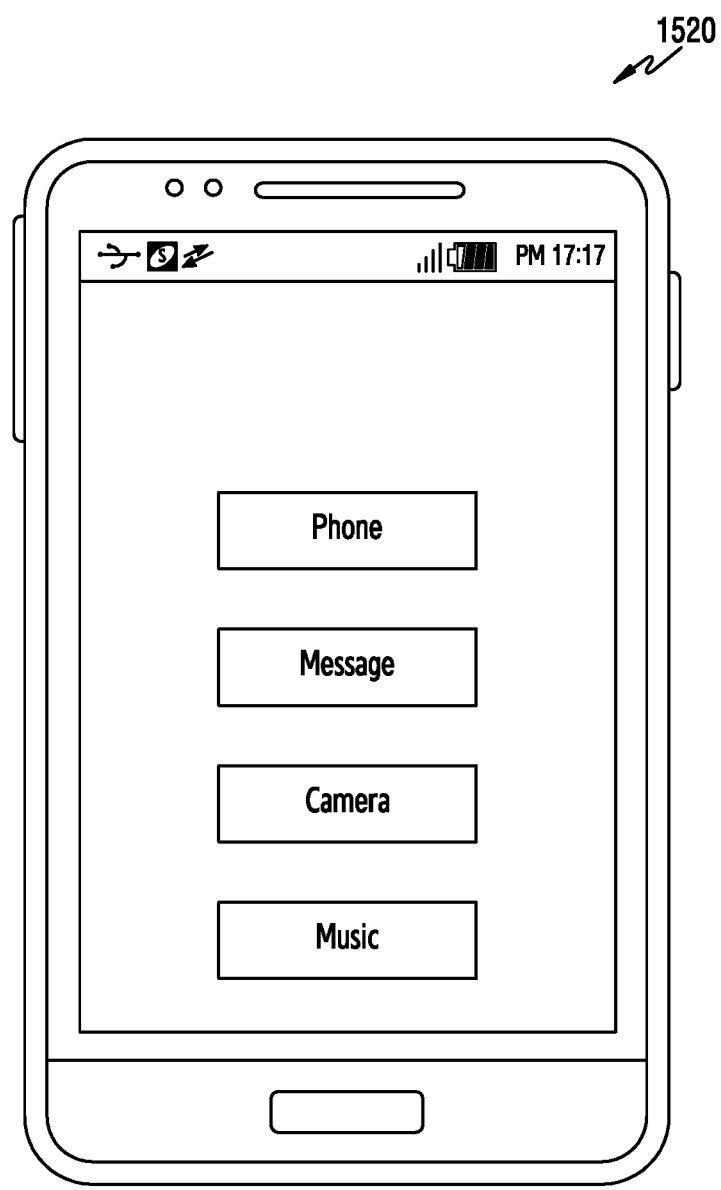

FIG. 14 illustrates a flowchart for processing an event corresponding to a pressure input and a touch input in an inundation mode in an electronic device according to one exemplary embodiment of the present disclosure. FIG. 15A to FIG. 15C illustrate screen configurations according to the inundation mode in the electronic device according to the one exemplary embodiment of the present disclosure. In the following description, the electronic device can include the entire of the electronic device 101 of FIG. 1A or at least a part (e.g., the processor 120) thereof.

Referring to FIG. 14, in operation 1401, the electronic device can check if the electronic device operates in an inundation mode. For example, if a change of electric charges (e.g., a touch input) is detected through at least a partial region of the touch panel 162, the processor 120 can determine that the electronic device 101 has fallen into water, and therefore will enter into the inundation mode. Additionally or alternatively, if the change of electric charges detected through the at least partial region of the touch panel 162 is maintained for a reference time interval, the processor 120 can determine that the electronic device 101 has fallen into water, and enters the inundation mode. For instance, the at least partial region of the touch panel 162 can be larger than a predetermined reference size or be the entire region of the touch panel 162.

If the electronic device operates in the inundation mode, in operation 1403, the electronic device can update a criterion value for touch recognition. For example, if a conductible liquid such as water comes in contact with the display 160, the processor 120 can increase the criterion value for touch recognition such that a touch error by the liquid is not generated. Additionally or alternatively, if the processor 120 updates the criterion value for recognition, a touch input is restricted and therefore, the processor 120 can reconfigure a User eXperience (UX)/User Interface (UI) of the electronic device 101, to make selection of an icon easier by pressure input, which generally may have a lower resolution than touch input. In detail, when the electronic device 101 operates in a normal mode, the processor 120 can, as in FIG. 15A, display icons of predefined sizes on the display 160 (1500). But when the electronic device 101 operates in the inundation mode, the processor 120 can, as in FIG. 15B, reconfigure and display the icons such that the icons displayed on the display 160 are increased in size based on a predefined setting (1510). In another example, when the electronic device 101 operates in the inundation mode, the processor 120 can, as in FIG. 15C, rearrange the icons displayed on the display 160 to include services that are usable under water (1520). The services that are usable under water can be set by the user or be set automatically based on a use history of the electronic device 101. For instance, if the electronic device 101 operates in the inundation mode, the processor 120 can automatically execute a specific function (e.g., a underwater camera application). For instance, the services that are usable under water includes application information that a user is possible to use under water.

In operation 1405, the electronic device can check if a 1st input is detected by a pressure device of the electronic device. For example, the processor 120 can check if a pressure input is detected by the pressure device (e.g., the pressure IC 190 of FIG. 1B).

If the electronic device detects the 1st input by the pressure device, in operation 1407, the electronic device can generate an event corresponding to the 1st input. For example, if the pressure event is generated by the pressure device when there is no touch event, the processor 120 can control to perform an operation or function corresponding to the pressure event for at least one application executing in the electronic device.

In operation 1409, the electronic device can check if the 1st input is released while the event corresponding to the 1st input is being generated. For example, the processor 120 can check if the generation of the pressure event by the pressure IC 190 is terminated.

If the 1st input through the pressure device is released, the electronic device can terminate the present algorithm for processing an event according to an input.

If the 1st input that is detected by the pressure device is not released, in operation 1411, the electronic device can check if a 2nd input is detected through a touch device. For example, the processor 120 can check if a touch input is detected based on the criterion value that is updated in operation 1403.

If the electronic device detects the 2nd input by the touch device while the 1st input is detected, in operation 1413, the electronic device can match the 1st input and the 2nd input. For example, the processor 120 can match the 1st input and the 2nd input based on a distance between a pressure coordinate of the 1st input and a touch coordinate of the 2nd input. For instance, the processor 120 can determine that inputs having the shortest interval between input coordinates are matched.

When the electronic device matches the 1st input and the 2nd input, in operation 1415, the electronic device can update the event corresponding to the 1st input, into an event corresponding to the 1st input and the 2nd input. For example, the processor 120 can generate the event corresponding to the matched touch input and pressure input. Using the updated event, the processor 120 can control to perform an operation or function corresponding to event occurrence information (e.g., touch coordinate and pressure strength) to control at least one application.

According to various exemplary embodiments of the present disclosure, the electronic device can adaptively adjust report rates of a touch device and a pressure device based on an operation mode of the electronic device. For example, if it is determined that a touch input is higher in use frequency than a pressure input (e.g., in case where the electronic device 101 is in a normal mode), the processor 120 can update the report rate of the touch device shorter than the report rate of the pressure device such that it can report touch input information more frequently than pressure input information. For example, if it is determined that the pressure input is higher in use frequency than the touch input (e.g., inundation mode or glove mode), the processor 120 can update the report rate of the pressure device higher than the report rate of the touch device such that it can report the pressure input information more frequently than the touch input information.

Figure 16:
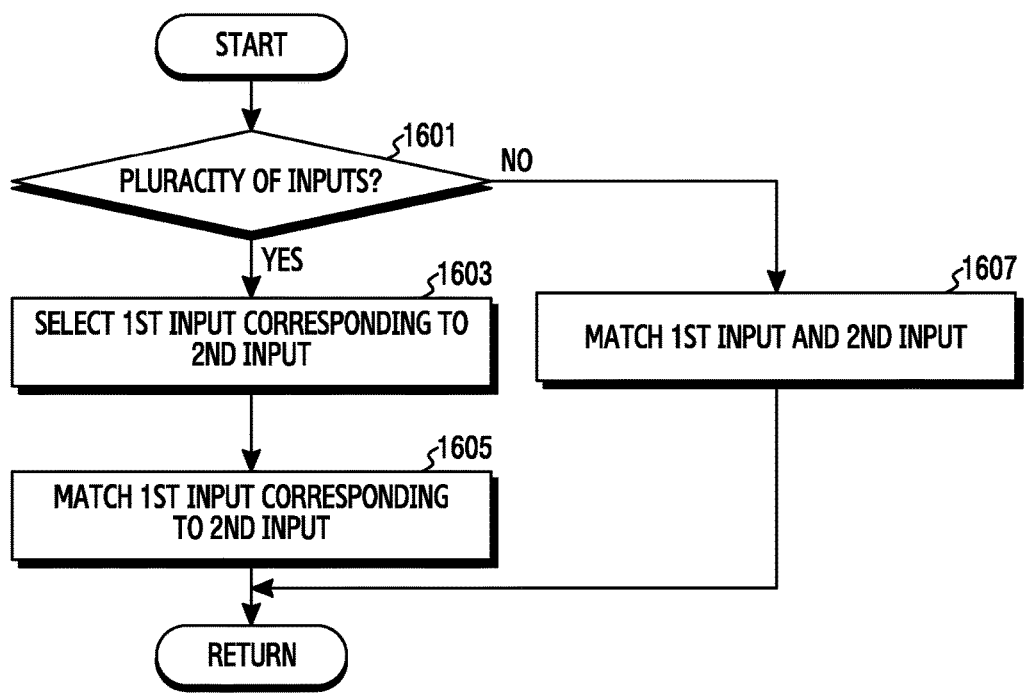
FIG. 16 illustrates a flowchart for matching a touch input and a pressure input in an electronic device according to one exemplary embodiment of the present disclosure.
Figure 17A:
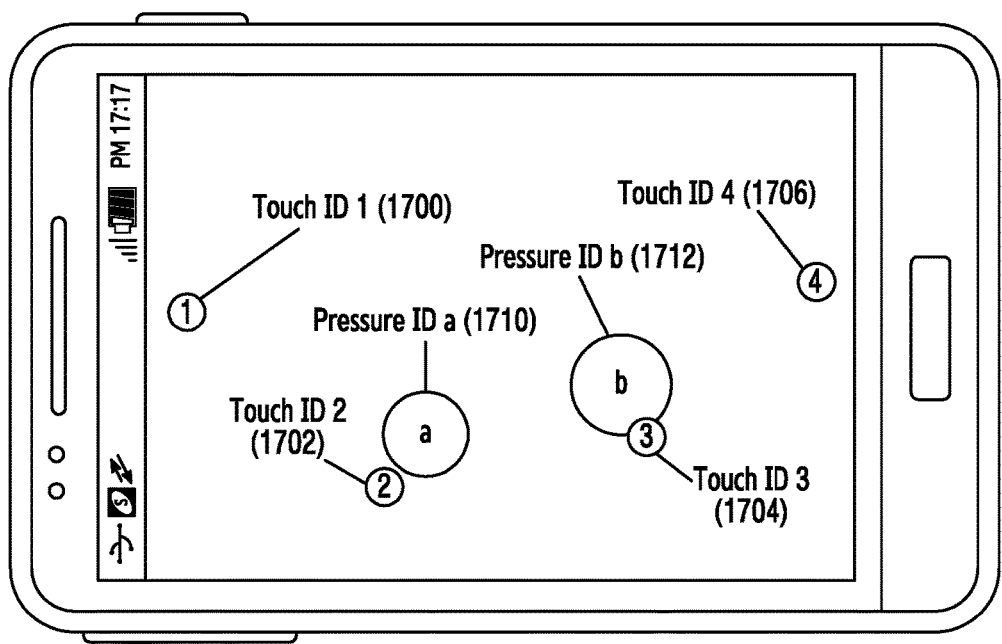
FIG. 17A, FIG. 17B and FIG. 17C illustrate conceptual diagrams for matching a touch input and a pressure input in an electronic device according to one exemplary embodiment of the present disclosure.
Figure 17B:
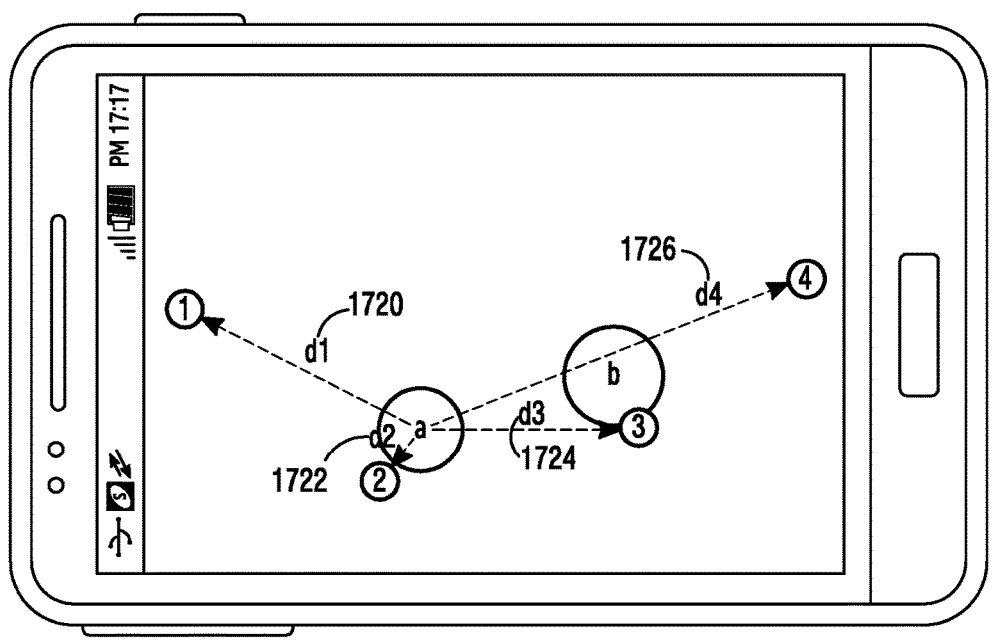
Figure 17C:
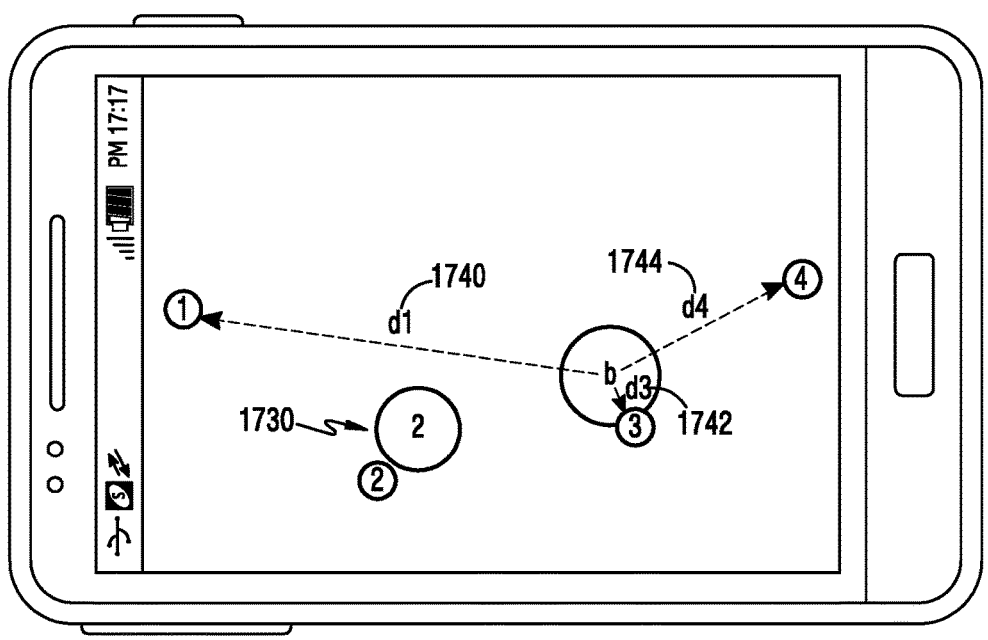

FIG. 16 illustrates a flowchart for matching a touch input and a pressure input in an electronic device according to one exemplary embodiment of the present disclosure. FIG. 17A to FIG. 17C illustrate conceptual diagrams for matching the touch input and the pressure input in the electronic device according to the one exemplary embodiment of the present disclosure. The following description is made for an operation for matching a 1st input and a 2nd input, as shown in operation 407 of FIG. 4. In the following description, the electronic device can include the entire of the electronic device 101 of FIG. 1A or at least a part (e.g., the processor 120) thereof.

Referring to FIG. 16, if the electronic device detects a 2nd input by a 2nd input device while a 1st input is detected (e.g. operation 405 of FIG. 4), in operation 1601, the electronic device can check if a plurality of 1st inputs or 2nd inputs exist. For example, the processor 120 can check if there is a plurality of touch inputs to be matched to one or more pressure inputs.

If a plurality of 1st inputs or 2nd inputs exist, in operation 1603, the electronic device can select the 1st input corresponding to the 2nd input. For example, as shown in FIG. 17A, a pressure device detects two pressure inputs 1710 and 1712 and a touch device detects four touch inputs 1700, 1702, 1704 and 1706. As shown in FIG. 17B, the processor 120 can calculate a distance 1720, 1722, 1724 or 1726 between a pressure coordinate of the pressure input a 1710 and a touch coordinate of each touch input 1700, 1702, 1704 or 1706 in order to select the touch input that matches with the pressure input a 1710. The processor 120 can select a touch input (e.g., the touch input 2 1702) having the shortest distance with the pressure coordinate of the pressure input a 1710, as the touch input for matching with the pressure input a 1710. In this case, the processor 120 can add information of the touch input (e.g., the touch input 2 1702) that is selected for matching with the pressure input a 1710, to the event corresponding to the pressure input a 1710 through a bit mask or flag. As shown in FIG. 17C, to select a touch input matched with the pressure input b 1712, the processor 120 can calculate a distance 1740, 1742 or 1744 between a pressure coordinate of the pressure input b 1712 and a touch coordinate of each touch input 1700, 1704 or 1706. That is, the processor 120 can calculate a distance between the touch coordinates of the remaining touch inputs (excluding the touch input (e.g., the touch input 2 1702) already selected for matching with the pressure input a 1710), and a pressure coordinate of the pressure input b 1712. The processor 120 can select a touch input (e.g., the touch input 3 1704) having the shortest distance with the pressure coordinate of the pressure input b 1712, as the touch input to be matched with the pressure input b 1712.

In operation 1605, the electronic device can match the selected 1st input to the corresponding 2nd input. For example, the processor 120 can generate and manage matching information of the 1st input and the 2nd input such that it can continuously maintain synchronization resulting from the matching of the 1st input and the 2nd input. For instance, the processor 120 can generate a table such as Table 1 below, that includes the matching information of the 1st input and the 2nd input.

TABLE 1

| touch ID | 1 | 2 | 3 | 4 | 5 | 6 | 7 |
|---|---|---|---|---|---|---|---|
| touch matched bit | 0 | 0 true | 0 true | 0 | x | x | x |

TABLE 2

| | Pressure ID | | | | |
|---|---|---|---|---|---|
| | a | b | c | d | e |
| Touch matched bit | 0 2 | 0 3 | x | x | x |

Table 1 can show that touch inputs of the touch ID 1 1700, the touch ID 2 1702, the touch ID 3 1704 and the touch ID 4 1706 have been detected, as shown in FIG. 17A. Table 2 shows that pressure inputs of the pressure ID a 1710 and the pressure ID b 1712 have been detected. Tables 1 and 2 further show that the touch input of the touch ID 2 1702 and the pressure input of the pressure ID a 1710 are matched with each other, and the touch input of the touch ID 3 1704 and the pressure input of the pressure ID b 1712 are matched with each other, in the "matched bit" row of each table.

According to one exemplary embodiment, when the electronic device matches a touch input and a pressure input, the electronic device generates and manages matching information of the touch input and the pressure input as in Table 1 and Table 2. Accordingly, efficiencies may be achieved since already-matched inputs may be removed from consideration in future matching operations. Therefore, the electronic device can decrease the load caused by the matching of the touch input and the pressure input. For example, if when the electronic device additionally detects a pressure ID c, the electronic device can calculate each of distances between a pressure coordinate of the pressure ID c and the touch coordinates of the touch ID 1 1700 and the touch ID 4 1706. Touch ID 2 1702 and touch ID 3 1704 are not considered. The electronic device can match the pressure input of the pressure ID c with any one touch input having the shortest distance with the pressure coordinate of the pressure ID c among the touch inputs of the touch ID 1 1700 and the touch ID 4 1706.

When only one 1st input and only one 2nd input exist, in operation 1607, the electronic device can determine that the 1st input detected through a 1st input device and the 2nd input detected through a 2nd input device are matched.

According to various exemplary embodiments of the present disclosure, when the electronic device matches a touch input and a pressure input, the electronic device can maintain a matching relationship of the touch input and the pressure input until before the corresponding touch input or pressure input is released.

Figure 18A:
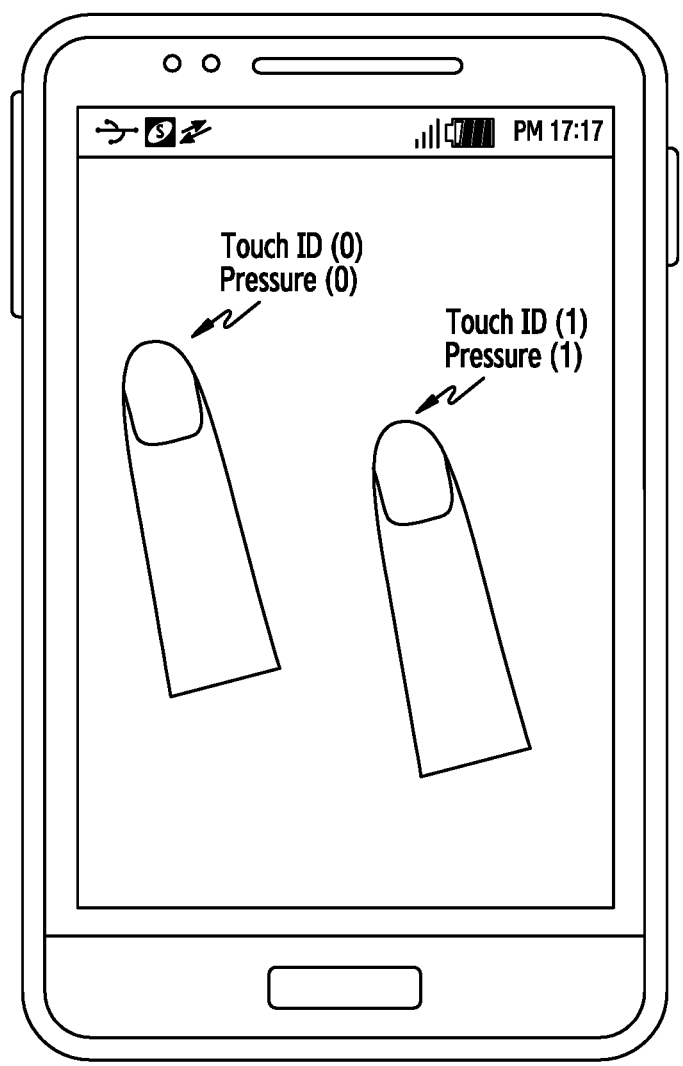
FIG. 18A, FIG. 18B and FIG. 18C illustrate conceptual diagrams for matching a touch input and a pressure input based on an input change in an electronic device according to one exemplary embodiment of the present disclosure.
Figure 18B:
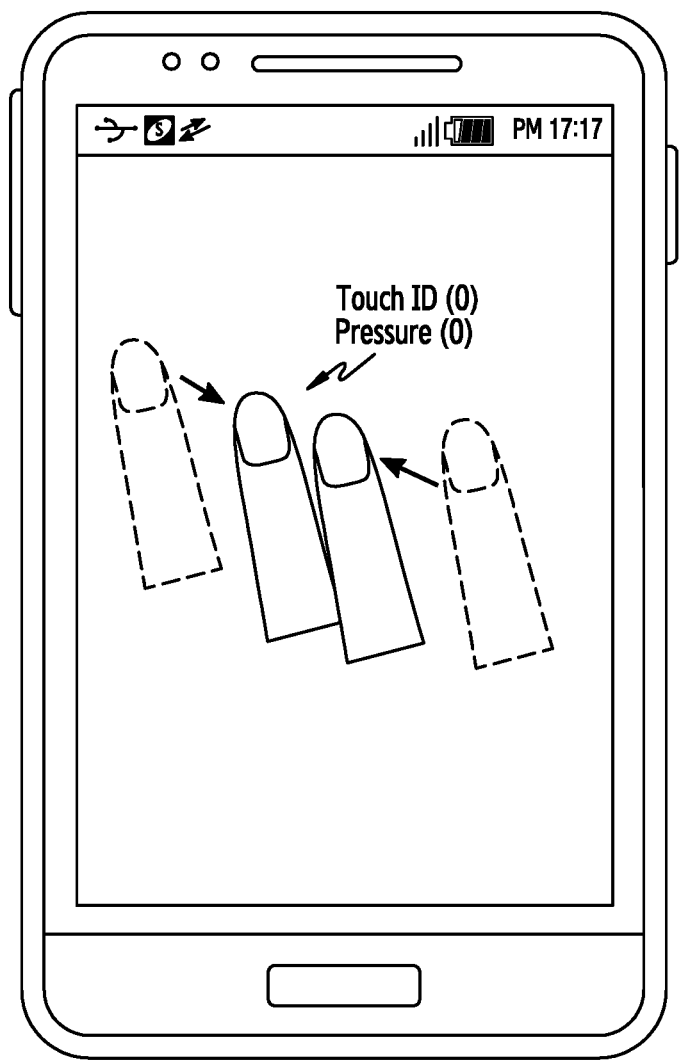
Figure 18C:
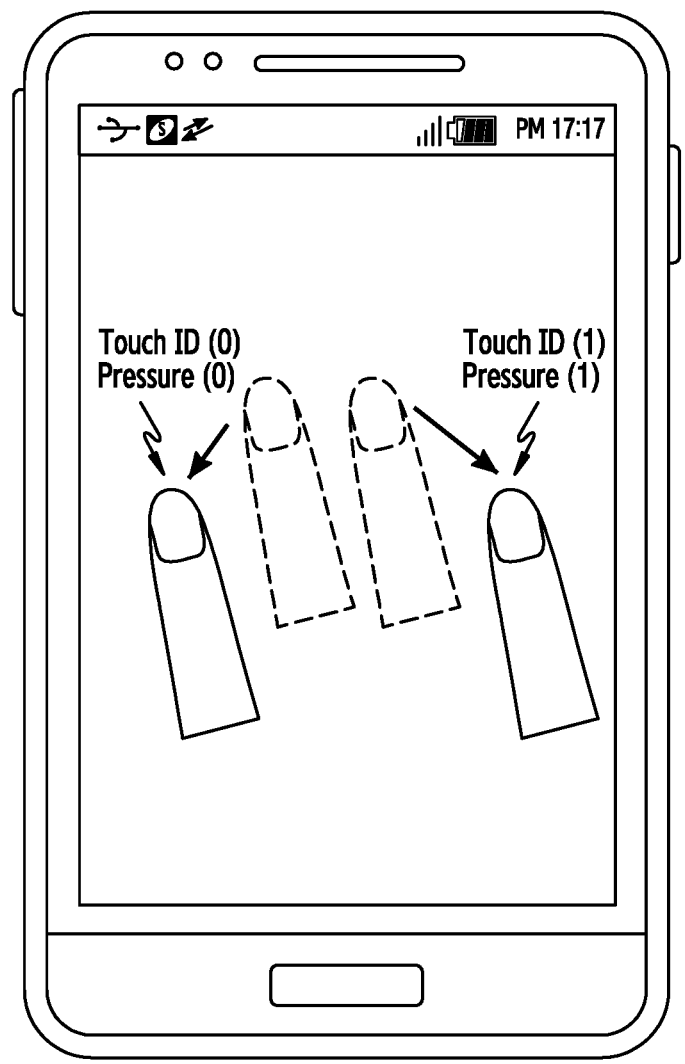

FIG. 18A to FIG. 18C illustrate conceptual diagrams for matching a touch input and a pressure input based on an input change in an electronic device according to one exemplary embodiment of the present disclosure. The following description is made for an operation for matching the touch input and the pressure input based on a motion of the touch input.

Referring to FIG. 18A, the electronic device can detect touch inputs of a touch ID 0 and a touch ID 1 using a touch device, and detect pressure inputs of a pressure ID 0 and a pressure ID 1 using a pressure device. In this case, based on distances between touch coordinates of the touch inputs and pressure coordinates of the pressure inputs, the electronic device can match the touch input of the touch ID 0 and the pressure input of the pressure ID 0 and match the touch input of the touch ID 1 and the pressure input of the pressure ID 1.

According to one exemplary embodiment, as in FIG. 18B, if an interval between the touch input of the touch ID 0 and the touch input of the touch ID 1 is narrowed to equal to or less than a criterion value as the input move, the electronic device can determine the touch input of the touch ID 0 and the touch input of the touch ID 1 to be one touch input (e.g., touch ID 0). For example, the touch IC 180 can determine the touch input of the touch ID 0 and the touch input of the touch ID 1 to be one touch input (e.g., touch ID 0) having a larger contact area. In this case, the pressure IC 190 can determine the pressure input of the pressure ID 0 and the pressure input of the pressure ID 1 to be one pressure input (e.g., pressure ID 0). Then, since one touch input and one pressure input exist, the electronic device can determine that the corresponding touch input and pressure input are matched with each other.

According to one exemplary embodiment, as shown in FIG. 18C, the user's fingers can again move to spread apart sot that the interval between the touch input of the touch ID 0 and the touch input of the touch ID 1 is widened to exceed the criterion value. As the inputs move, the electronic device can detect the touch input of the touch ID 0 and the touch input of the touch ID 1. For example, the touch IC 180 can determine that the touch input of the touch ID 1 is detected additionally besides the touch input of the touch ID 0 that is detected in FIG. 18B. The pressure IC 190 can determine that the pressure input of the pressure ID 1 is detected additionally besides the pressure input of the pressure ID 0 that is detected in FIG. 18B. At this time, the electronic device can again match the touch inputs and the pressure inputs. For example, in case where the electronic device detects the pressure input of the pressure ID 1 after detecting the touch input of the touch ID 1, the electronic device can again match the touch inputs and the pressure inputs at a time point of detecting the pressure ID 1.

Figure 19:
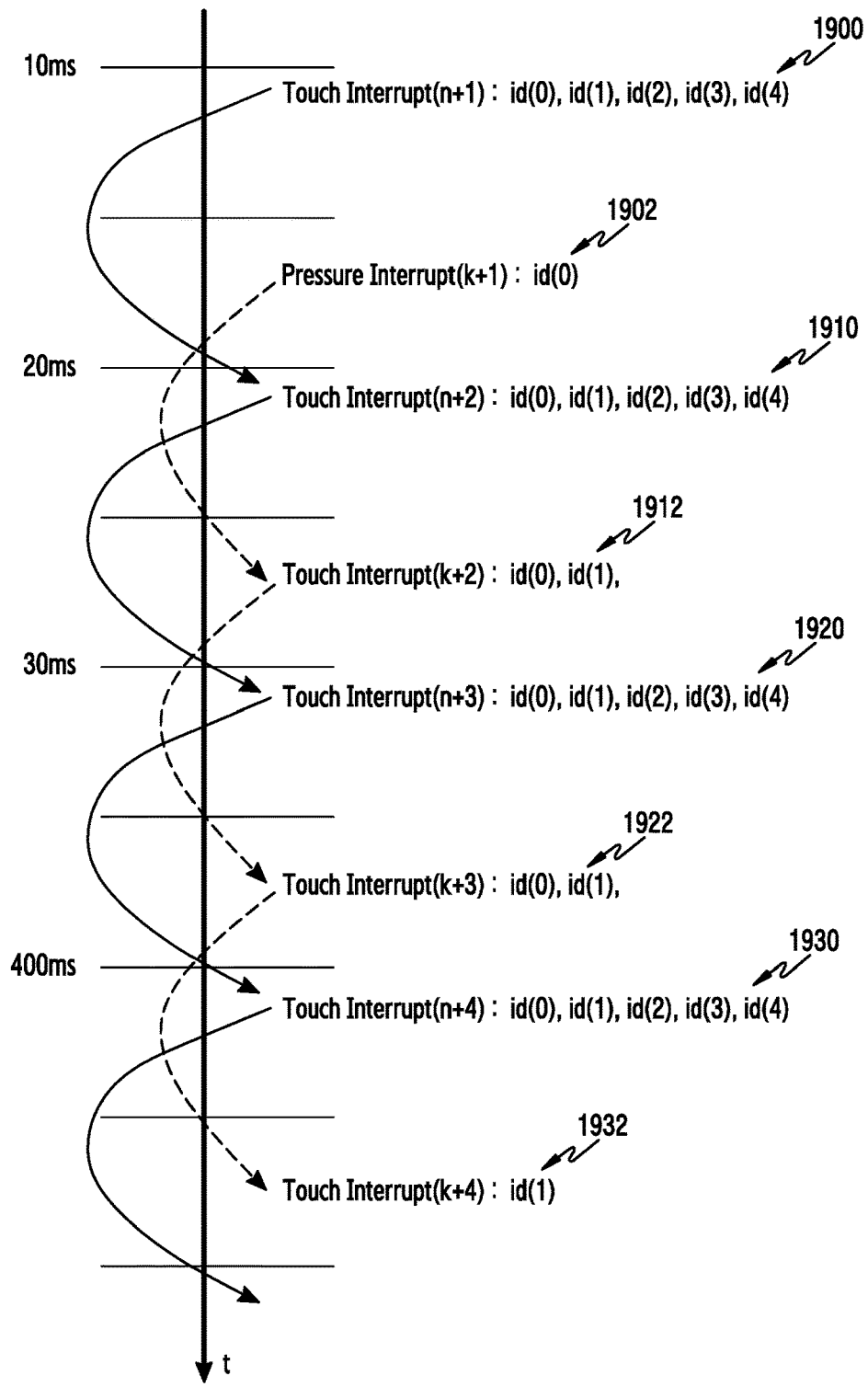
FIG. 19 illustrates a conceptual diagram for generating an interrupt for a touch input and a pressure input in an electronic device according to one exemplary embodiment of the present disclosure.

FIG. 19 illustrates a conceptual diagram for generating an interrupt for a touch input and a pressure input in an electronic device according to one exemplary embodiment of the present disclosure. In the following description, it can be assumed that the electronic device generates an interrupt every 10 ms for the touch input and the pressure input.

According to one exemplary embodiment, if an interrupt by a touch input is generated (1900), the electronic device can check touch inputs of touch ID 0, 1, 2, 3 and 4 that are detected through the touch IC 180, for example if four touch inputs are detected by the touch panel.

According to one exemplary embodiment, if an interrupt by a pressure input is generated (1902), the electronic device can check a pressure input of a pressure ID 0 that is detected through the pressure IC 190, for example if one pressure input is detected. In this case, the electronic device can match any one touch input among touch inputs with the pressure input of the pressure ID 0. For example, when the electronic device matches the pressure input of the pressure ID 0 and the touch input of the touch ID 2, the electronic device can generate tables such as Table 3 and Table 4 below. The tables may be stored in the memory of the electronic device. For instance, in case of an actual system, the electronic device can require a memory region of a one-dimensional array level corresponding to a 'pressure data' field and a 'matched index touch' field. For instance, the electronic device can require the time of about 0.036 milliseconds (ms) for matching the pressure input of the pressure ID 0 and the touch input of the touch ID 2.

TABLE 3

| touch index | 0 | 1 | 2 | 3 | 4 | 5 | 6 |
|---|---|---|---|---|---|---|---|
| touch press status | true | true | true | true | true | | |
| pressure data | −1 | −1 | −1 | −1 | −1 | 0 | 0 |

TABLE 4

| pressure index | 0 | 1 | 2 | 3 | 4 | 5 | 6 |
|---|---|---|---|---|---|---|---|
| matched index to touch | 2 | | | | | | |
| pressure device data | 150 | | | | | | |

As shown in Table 3 and Table 4, the "true" of the "touch press status" field indicate that touch input have been detected. The "−1" of the "pressure data" field can denote an initialized preparation stage for inserting pressure data of a pressure input matched to the corresponding touch input. The "matched index touch" field can denote identification information of the touch input matched with the corresponding pressure input. The "pressure device data" field can denote pressure data (e.g. pressure strength) of the corresponding pressure input.

If the electronic device detects pressure data of the pressure ID 0 at a time point of the interrupt 1902, the electronic device can insert pressure data of the pressure input matched with the touch ID 2 as in Table 5 below.

TABLE 5

| touch index | 0 | 1 | 2 | 3 | 4 | 5 | 6 |
|---|---|---|---|---|---|---|---|
| touch press status | true | true | true | true | true | | |
| pressure data | −1 | −1 | 150 | −1 | −1 | 0 | 0 |
| pressure index | 0 | 1 | 2 | 3 | 4 | 5 | 6 |
| matched index to touch | 2 | | | | | | |
| pressure device data | 30 | | | | | | |

In Table 5, the pressure IC 190 can detect new pressure data (e.g., 30) of the pressure ID 0 after inserting the pressure data of 150 of the pressure ID 0 into the touch ID 2 matched with the pressure input.

According to one exemplary embodiment, if an interrupt by a touch input is again generated (1910), the electronic device can check touch information of touch inputs of touch ID 0, 1, 2, 3 and 4 that are detected through the touch IC 180, and matched pressure data. Four touch inputs are maintained on display 160 throughout this example. Accordingly to this, the electronic device can initialize a "pressure data" field of the touch ID 2 to "−1" as in Table 6 below.

TABLE 6

| touch index | 0 | 1 | 2 | 3 | 4 | 5 | 6 |
|---|---|---|---|---|---|---|---|
| touch press status | true | true | true | true | true | | |
| pressure data | −1 | −1 | −1 | −1 | −1 | 0 | 0 |
| pressure index | 0 | 1 | 2 | 3 | 4 | 5 | 6 |
| matched index to touch | 2 | | | | | | |
| pressure device data | 30 | | | | | | |

According to one exemplary embodiment, if an interrupt by another pressure input is again generated (1912), the electronic device can check pressure inputs of a pressure ID 0 and a pressure ID 1 that are detected through the pressure IC 190. For example, when the electronic device matches the pressure input of the pressure ID 1 and the touch input of the touch ID 0, the electronic device can generate a table such as Table 7 below. For instance, the electronic device can require the time of about 0.031 ms for matching the pressure input of the pressure ID 1 and the touch input of the touch ID 0.

TABLE 7

| touch index | 0 | 1 | 2 | 3 | 4 | 5 | 6 |
|---|---|---|---|---|---|---|---|
| touch press status | true | true | true | true | true | | |
| pressure data | −1 | −1 | −1 | −1 | −1 | 0 | 0 |
| pressure index | 0 | 1 | 2 | 3 | 4 | 5 | 6 |
| matched index to touch | 2 | 0 | | | | | |
| pressure device data | 30 | 400 | | | | | |

If the electronic device detects pressure data of the pressure ID 0 and the pressure ID 1 at a time point of the interrupt 1912, the electronic device can insert pressure data of the pressure input matched with the touch ID 0 and the touch ID 2 as in Table 8 below.

TABLE 8

| touch index | 0 | 1 | 2 | 3 | 4 | 5 | 6 |
|---|---|---|---|---|---|---|---|
| touch press status | true | true | true | true | true | | |
| pressure data | 400 | −1 | 30 | −1 | −1 | 0 | 0 |
| pressure index | 0 | 1 | 2 | 3 | 4 | 5 | 6 |
| matched index to touch | 2 | 0 | | | | | |
| pressure device data | 80 | 500 | | | | | |

In Table 8, the pressure IC 190 can detect new pressure data (e.g., 80 and/or 500) of the pressure ID 0 and the pressure ID 1 after inserting the pressure data of 30 and 400 of the pressure ID 0 and the pressure ID 1 into the touch input matched with the pressure input.

According to one exemplary embodiment, if an interrupt by a touch input is again generated (1920), the electronic device can check touch information of touch inputs of touch ID 0, 1, 2, 3 and 4 that are detected through the touch IC 180, and matched pressure data. Accordingly to this, the electronic device can initialize "pressure data" fields of the touch ID 0 and the touch ID 2 to "−1".

According to one exemplary embodiment, when an interrupt by a pressure input is again generated (1922), the electronic device can check pressure inputs of a pressure ID 0 and a pressure ID 1 that are detected through the pressure IC 190. In this case, the electronic device can insert pressure data (e.g., 80) of the pressure ID 0 into the "pressure data" field of the touch ID 2, and insert pressure data (e.g., 500) of the pressure ID 1 into the "pressure data" field of the touch ID 0.

According to one exemplary embodiment, when an interrupt by a touch input is again generated (1930), the electronic device can check touch information of touch inputs of touch ID 0, 1, 2, 3 and 4 that are detected through the touch IC 180, and the matched pressure data. Accordingly to this, the electronic device can initialize "pressure data" fields of the touch ID 0 and the touch ID 2 back to "−1".

According to one exemplary embodiment, when an interrupt by a pressure input is again generated (1932), the electronic device can check a pressure input of a pressure ID 1 that is detected through the pressure IC 190. In this case, the electronic device can insert pressure data (e.g., 300) of the pressure ID 1 into the "pressure data" field of the touch ID 0.

As described above, when an interrupt for a touch input is generated, the electronic device (e.g., the processor 120) can read coordinate information at which a touch input is detected from the touch IC 180. Also, when an interrupt for a pressure input is generated, the electronic device (e.g., the processor 120) can at once read coordinate and pressure information at which a pressure input is detected from the pressure IC 190. That is, in case where an interrupt for an input device is generated, the electronic device reads only necessary information (i.e., coordinate information at which an input is detected), so a load by the entire system may not generated. For instance, the entire system can include the number of channels or sensors of an input that is detected through the input device.

Figure 20:
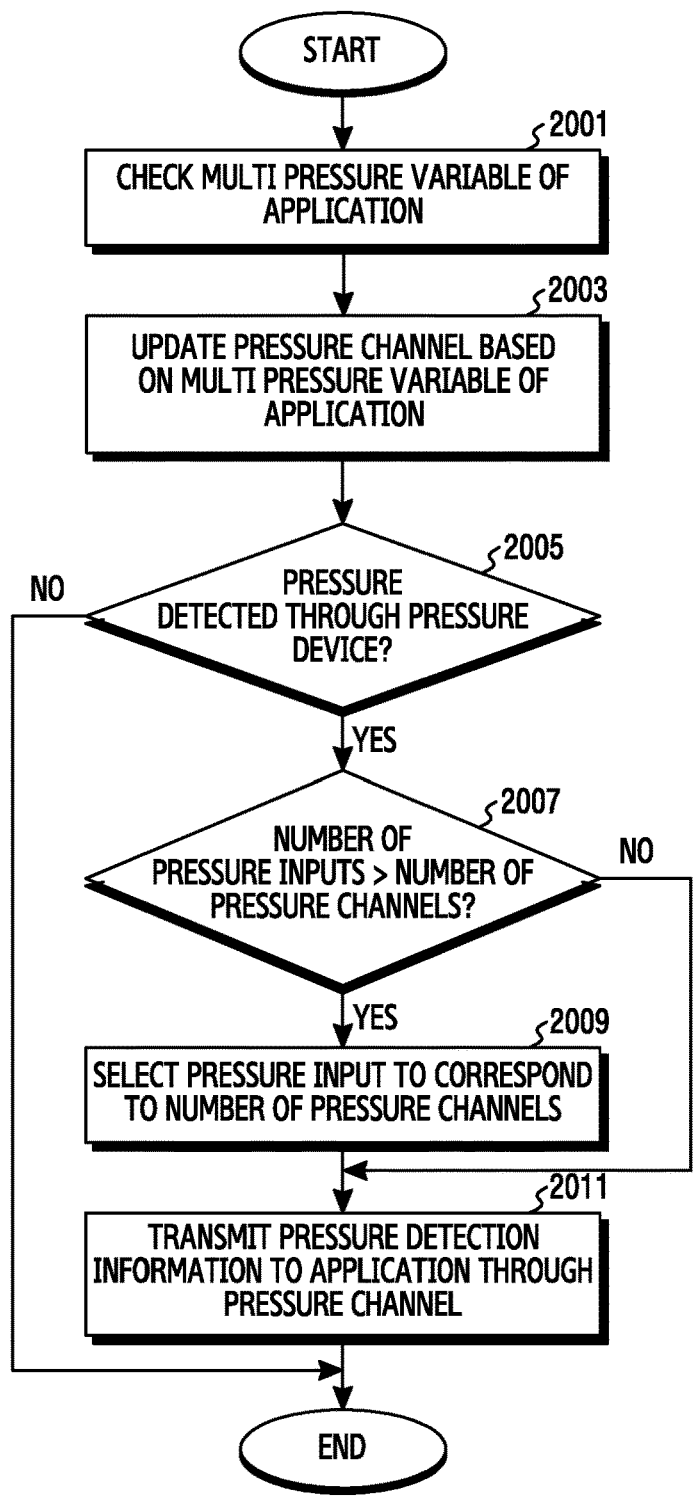
FIG. 20 illustrates a flowchart for detecting multiple pressure inputs for an application in an electronic device according to one exemplary embodiment of the present disclosure.

FIG. 20 illustrates a flowchart for adjusting a multi pressure based on an application in an electronic device according to various exemplary embodiments of the present disclosure. In the following description, the electronic device can include the entire of the electronic device 101 of FIG. 1A or at least a part (e.g., the processor 120) thereof.

Referring to FIG. 20, in operation 2001, the electronic device can check a multi pressure variable of an application that is executed in the electronic device. For example, the processor 120 can check a channel value (e.g., a channel count) of pressure inputs that are supported in the application.

In operation 2003, the electronic device can update a pressure channel value of the electronic device, based on the multi pressure variable of the application. For example, the processor 120 can set a pressure channel count of a pressure table to correspond to the multi pressure variable of the application. For example, if the application supports 4 multi pressure inputs, the pressure channel count is set to 4.

In operation 2005, the electronic device can check if a pressure input is detected through a pressure device. For example, when an interrupt for a pressure input is generated, the processor 120 can check if a pressure input that is detected in the pressure IC 190 exists.

In case where the electronic device detects the pressure input through the pressure device, in operation 2007, the electronic device can check if the number of pressure inputs exceeds the number of pressure channels of the electronic device that are updated in operation 2003. That is, the electronic device can check whether it can transmit the pressure input detected through the pressure device based on the channel value of the available multi pressure supported in the application. For example, if the pressure channel count is set to 4, and 3 pressure inputs are received, then the electronic device may determine that the number of pressure inputs does not exceed the number of pressure channels of the electronic device.

In case where the number of pressure inputs is equal to or is less than the number of pressure channels of the electronic device, in operation 2011, the electronic device can transmit the pressure input detected through the pressure device to the application. For example, the electronic device can match pressure data of the pressure input detected through the pressure device corresponding touch inputs.

In case where the number of pressure inputs exceeds the number of pressure channels of the electronic device, in operation 2009, the electronic device can select pressure inputs of the number corresponding to the pressure channel, among the pressure inputs detected through the pressure device. For example, the processor 120 can select the pressure inputs of the number corresponding to the pressure channel, based on pressure strengths of the pressure inputs. In another example, the processor 120 can select the pressure inputs of the number corresponding to the pressure channel, based on when the pressure inputs are detected.

In operation 2011, the electronic device can transmit the pressure inputs of the number corresponding to the pressure channel, to the application.

According to various exemplary embodiments of the present disclosure, the electronic device can update a pressure channel value of the electronic device while content is executed, based on the type of the corresponding content executed in the electronic device.

Figure 21:
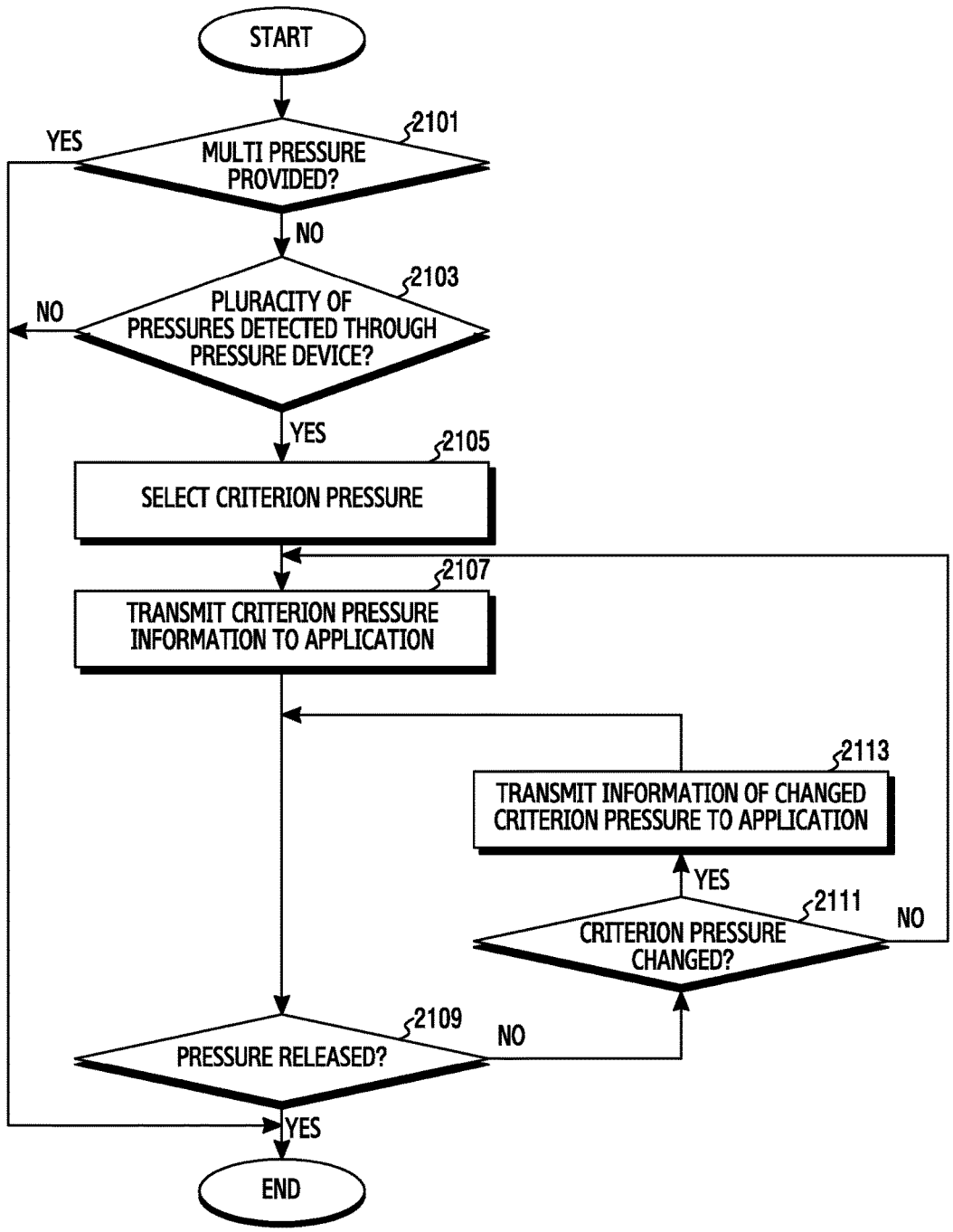
FIG. 21 illustrates a flowchart for providing a pressure input to an application in an electronic device according to one exemplary embodiment of the present disclosure.
Figure 22A:
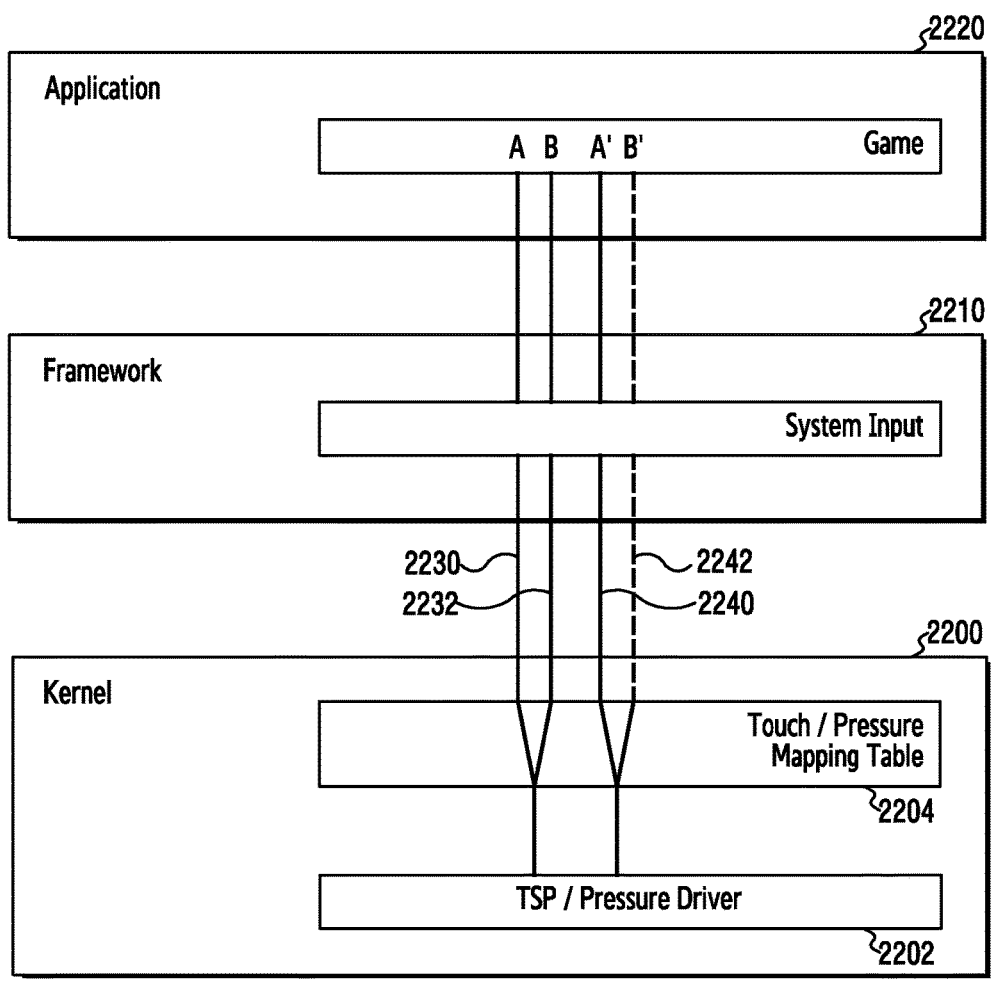
FIG. 22A and FIG. 22B illustrate block diagrams of a program module for providing a pressure input to an application in an electronic device according to one exemplary embodiment of the present disclosure.
Figure 22B:
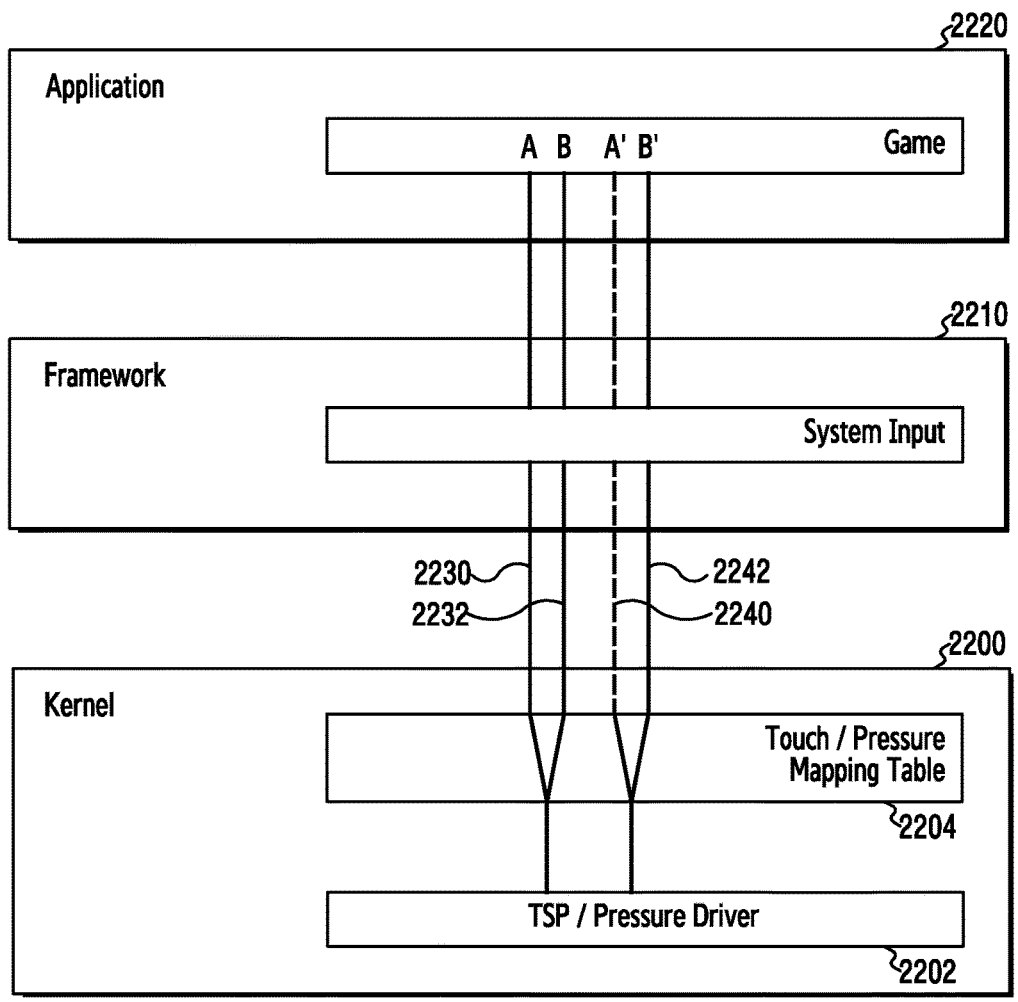

FIG. 21 illustrates a flowchart for providing a pressure input to an application in an electronic device according to various exemplary embodiments of the present disclosure. FIG. 22A to FIG. 22B illustrate block diagrams of a program module for providing a pressure input to an application in an electronic device according to various exemplary embodiments of the present disclosure. In the following description, the electronic device can include the entire of the electronic device 101 of FIG. 1A or at least a part (e.g., the processor 120) thereof.

Referring to FIG. 21, in operation 2101, the electronic device can check if an application that is being executed in the electronic device supports a multi pressure, i.e. whether the application can accept multiple concurrent pressure inputs.

In case where the application that is being executed in the electronic device supports the multi pressure, the electronic device can terminate the present algorithm for selectively transmitting pressure inputs. For example, the electronic device can transmit multi pressure inputs detected through a pressure device, to the application.

In case where the application that is being executed in the electronic device does not support the multi pressure, in operation 2103, the electronic device can check if a plurality of pressure inputs are detected through the pressure device.

In case where the electronic device detects one pressure input using the pressure device, the electronic device can terminate the present algorithm for selectively transmitting pressure inputs. For example, the electronic device can transmit one pressure input detected through the pressure device, to the application.

In case where the electronic device detects the plurality of pressure inputs through the pressure device, in operation 2105, the electronic device can select a criterion pressure among the plurality of pressure inputs. For example, the processor 120 can select the criterion pressure based on pressure strengths of the pressure inputs detected by the pressure device. As another example, the processor 120 can select the criterion pressure based on when the pressure inputs were detected by the pressure device.

In operation 2107, the electronic device can transmit criterion pressure information to the application. For example, as in FIG. 22A, it can be assumed that the electronic device detects touch inputs of a touch ID A and a touch ID B through the touch device, and detects pressure inputs of a pressure ID A' and a pressure ID B' through the pressure device. In case where an application supports a multi touch, the electronic device can transmit touch input information (e.g., touch coordinate) of the touch ID A and the touch ID B to the application 2220 (2230 and 2232). In case where the application does not support the multi pressure, the electronic device can transmit pressure data (e.g., pressure strength) of the pressure ID A', which is the determined criterion pressure, to the application 2220 (2240). For instance, the electronic device can match the pressure data of the pressure ID A' with the touch coordinate of the touch ID A at which the pressure ID A' is matched with the pressure input, and transmit the matching result to the application.

In operation 2109, the electronic device can check if the pressure input is released. For example, in case where the pressure input detected through the pressure IC 190 no longer exists, the processor 120 can determine that the pressure input is released.

In case where the pressure input is not released, in operation 2111, the electronic device can check if the criterion pressure is changed. For example, in case where a pressure input of the criterion pressure that is set in operation 2105 is released, the processor 120 can determine that the criterion pressure is changed into the other remaining pressure input. As another example, when a change of pressure data (e.g., pressure strength) of each pressure input occurs, the processor 120 can change the criterion pressure based on the pressure data of the pressure inputs. For instance, the processor 120 can set the pressure input with the greatest strength as the criterion pressure.

In case where the criterion pressure is not changed, in operation 2107, the electronic device can transmit criterion pressure information to the application. For example, the processor 120 can transmit pressure data of a pressure input that is set as the criterion pressure, to the application, together with a touch coordinate of a touch input matched with the corresponding pressure input.

In case where the criterion pressure is changed, in operation 2113, the electronic device can transmit pressure data of the changed criterion pressure to the application. For example, as in FIG. 22B, in case where the criterion pressure is changed into the touch ID B, the electronic device can transmit pressure data (e.g., pressure strength) of the pressure ID B' to the application 2220 (2242). For instance, the electronic device can match the pressure data of the pressure ID B' with a touch coordinate of the touch ID B at which the pressure ID B' is matched with the pressure input, and transmit the matching result to the application.

An electronic device and an operation method thereof according to various exemplary embodiments automatically generate an event corresponding to at least one of a touch input and a pressure input without requiring the user to change input mode of the electronic device, thereby allowing for easier operation.

An electronic device and an operation method thereof according to various exemplary embodiments match a multi touch input acquired through a touch device and a multi pressure input acquired through a pressure device, thereby allowing for simpler operation.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Further, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the scope of various embodiments of the present disclosure. Therefore, it should be construed that all modifications and changes or various other embodiments based on the technical idea of various embodiments of the present disclosure fall within the scope of various embodiments of the present disclosure.

What is claimed is:

1. An electronic device comprising:
a display;
a touch device;
a pressure device; and
at least one processor,
wherein the at least one processor is configured to:
   if a first touch input is detected by the touch device, generate a first event corresponding to the first touch input at a starting time of the detection,
   if first pressure input is detected by the pressure device during the first touch input is detected and the first pressure input and the first touch input are matched, update the first event as an event corresponding to the first touch input and the first pressure input at the starting time of the detection of the pressure input,
   if the first touch input is not detected during the generation of the first event, finish the generation of the first event regardless of the detection of the first pressure input,
   if a second pressure input is detected and the second pressure input is maintained during a first reference time duration, generate a second event corresponding to the second pressure input, and
   if a second touch input is detected during third pressure input is detected, generate a third event corresponding to the second touch input and the third pressure input.

2. The electronic device of claim 1, wherein the touch device comprises a touch panel and a touch Integrated Circuit (IC), and the pressure device comprises a pressure panel and a pressure IC.

3. The electronic device of claim 2, wherein the touch panel and the pressure panel overlap with the display.

4. The electronic device of claim 1, wherein the processor is further configured to, if the second event is generated, control an operation or function of an application based on a coordinate of the second pressure input or the coordinate and a pressure strength of the second pressure input.

5. The electronic device of claim 1, wherein the processor is further configured to, if the first event is updated, control an operation or function of an application based on a coordinate of the first touch input and a pressure strength of the first pressure input.

6. The electronic device of claim 1, wherein the processor is further configured to: match the first touch input and the first pressure input in case that a distance between a coordinate of the first touch input and a coordinate of the first pressure input is a nearest distance among distances between coordinates of one and more touch inputs and coordinates of one and more pressure inputs.

7. A method for operating in an electronic device comprising a pressure device and a touch device, the method comprising:
   if a first touch input is detected by the touch device, generating a first event corresponding to the first touch input at a starting time of the detection,
   if a first pressure input is detected by the pressure device during the first touch input is detected and the first pressure input and the first touch input are matched, updating the first event as an event corresponding to the first touch input and the first pressure input at the starting time of the detection of the pressure input,
   if the first touch input is not detected during the generation of the first event, finishing the generation of the first event regardless of the detection of the first pressure input, if a second pressure input is detected and the second pressure input is maintained during a first reference time duration, generating a second event corresponding to the second pressure input, and if a second touch input is detected during a third pressure input is detected, generating a third event corresponding to the second touch input and the third pressure input.

8. The method of claim 7, wherein the operation of generating the second event corresponding to the second pressure input comprises performing an operation or function of an application based on a coordinate of the second pressure input or the coordinate and a pressure strength of the second pressure input.

9. The method of claim 7 further comprising:

if the first event is updated, performing an operation or function of an application to correspond to a coordinate of the first touch input and a pressure strength of the first pressure input.

10. The method of claim 7, further comprising:

matching the first touch input and the first pressure input in case that a distance between a coordinate of the first touch input and a coordinate of the first pressure input is a nearest distance among distances between coordinates of one and more touch inputs and coordinates of one and more pressure inputs.

11. An electronic device comprising:

a display;

a first input device configured to detect a first input;

a second input device configured to detect a second input; and at least one processor, wherein the at least one processor is configured to:

if a first input is detected by the first input device, generate a first event corresponding to the first input at a starting time of the detection, if a second input is detected by the second input device during the first input is detected and the second input and the first input are matched, update the first event as an event corresponding to the first input and the second input at the starting time of the detection of the second input, if the first input is not detected during the generation of the first event, finish the generation of the first event regardless of the detection of the second input, if a third input is detected by the second input device and the third input is maintained during a first reference time duration, generate a second event corresponding to the third input, and if fourth input is detected by the first input device during fifth input is detected by the second input device, generate a third event corresponding to the fourth input and the fifth input.

12. The electronic device of claim 11, wherein the first input device is a touch device and the second input device is a pressure device.

13. The electronic device of claim 11, wherein the processor is further configured to, match the first input and the second input in case that a distance between a coordinate of the first input and a coordinate of the second input is a nearest distance among distances between coordinates of one and more inputs detected by the first input device and coordinates of one and more inputs detected by the second input device.

* * * * *